(12) United States Patent
Uekusa et al.

(10) Patent No.: US 11,196,934 B2
(45) Date of Patent: Dec. 7, 2021

(54) IMAGE CAPTURING APPARATUS AND CONTROL METHOD THEREOF

(71) Applicant: CANON KABUSHIKI KAISHA, Tokyo (JP)

(72) Inventors: Tomotaka Uekusa, Yokohama (JP); Hiroyuki Yaguchi, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/935,006

(22) Filed: Jul. 21, 2020

(65) Prior Publication Data

US 2021/0044753 A1    Feb. 11, 2021

(30) Foreign Application Priority Data

Aug. 7, 2019   (JP) .............................. JP2019-145659

(51) Int. Cl.
*H04N 5/232*   (2006.01)
*H04N 5/235*   (2006.01)

(52) U.S. Cl.
CPC ....... *H04N 5/23296* (2013.01); *H04N 5/2351* (2013.01); *H04N 5/2353* (2013.01); *H04N 5/23299* (2018.08); *H04N 5/232121* (2018.08); *H04N 5/232122* (2018.08)

(58) Field of Classification Search
CPC ............. H04N 5/23296; H04N 5/2353; H04N 5/23299; H04N 5/232121; H04N 5/232122; H04N 5/2351; H04N 5/232127; H04N 5/23238; H04N 9/045; H04N 5/232; H04N 5/232945; H04N 5/232935

See application file for complete search history.

(56) References Cited

U.S. PATENT DOCUMENTS

| | | | | |
|---|---|---|---|---|
| 6,624,846 B1* | 9/2003 | Lassiter | ........... | H04N 5/232945 348/211.4 |
| 6,657,667 B1* | 12/2003 | Anderson | .......... | H04N 5/23238 348/333.12 |
| 6,720,997 B1* | 4/2004 | Horie | .................. | H04N 5/23238 348/218.1 |
| 6,947,076 B1* | 9/2005 | Kitaguchi | .......... | H04N 5/23238 348/218.1 |
| 7,656,429 B2* | 2/2010 | Larson | ............... | H04N 5/23238 348/208.14 |
| 2002/0080257 A1* | 6/2002 | Blank | .............. | H04N 5/232933 348/345 |

(Continued)

FOREIGN PATENT DOCUMENTS

JP    2008-096582 A    4/2008
JP    4609315 B    1/2011

*Primary Examiner* — Timothy J Henn
(74) *Attorney, Agent, or Firm* — Canon U.S.A., Inc. IP Division

(57) ABSTRACT

An apparatus having a sensor that performs photoelectric conversion on light formed by an optical system and outputs a resultant image, stores in memory a first image output from the sensor in a state that the optical system is controlled to a first focal length, and displays, on a second image output from the sensor in a state that the optical system is controlled to a second focal length which is shorter than the first focal length, a shooting frame indicating an area in which the second image and the first image coincide.

20 Claims, 31 Drawing Sheets

(56) References Cited

U.S. PATENT DOCUMENTS

| | | | | |
|---|---|---|---|---|
| 2010/0208045 A1* | 8/2010 | Willmann | ............... | A61H 3/061 |
| | | | | 348/62 |
| 2011/0018970 A1* | 1/2011 | Wakabayashi | ... | H04N 5/232123 |
| | | | | 348/47 |
| 2011/0050909 A1* | 3/2011 | Ellenby | .................. | G03B 17/24 |
| | | | | 348/207.1 |
| 2011/0242369 A1* | 10/2011 | Misawa | ................. | H04N 5/232 |
| | | | | 348/240.2 |
| 2019/0206013 A1* | 7/2019 | Okuyama | .......... | H04N 5/23212 |

* cited by examiner

F I G. 4
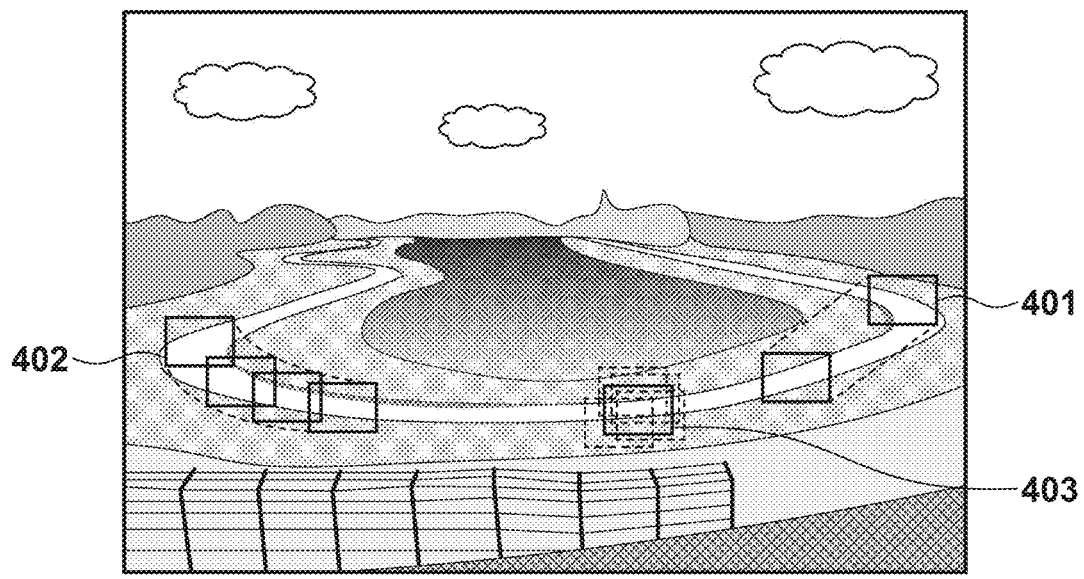

SHOOTING MODE:
SHUTTER-PRIORITY AE
APERTURE (F VALUE): F4
EXPOSURE TIME: 1/80
ISO SENSITIVITY: 100
EXPOSURE COMPENSATION: ±0
FOCAL LENGTH: 300mm
FLUSH: N/A
FILTER: N/A

SHOOTING MODE:
SHUTTER-PRIORITY AE
APERTURE (F VALUE): F5.6
EXPOSURE TIME: 1/50
ISO SENSITIVITY: 200
EXPOSURE COMPENSATION: ±1
FOCAL LENGTH: 400mm
FLUSH: N/A
FILTER: N/A

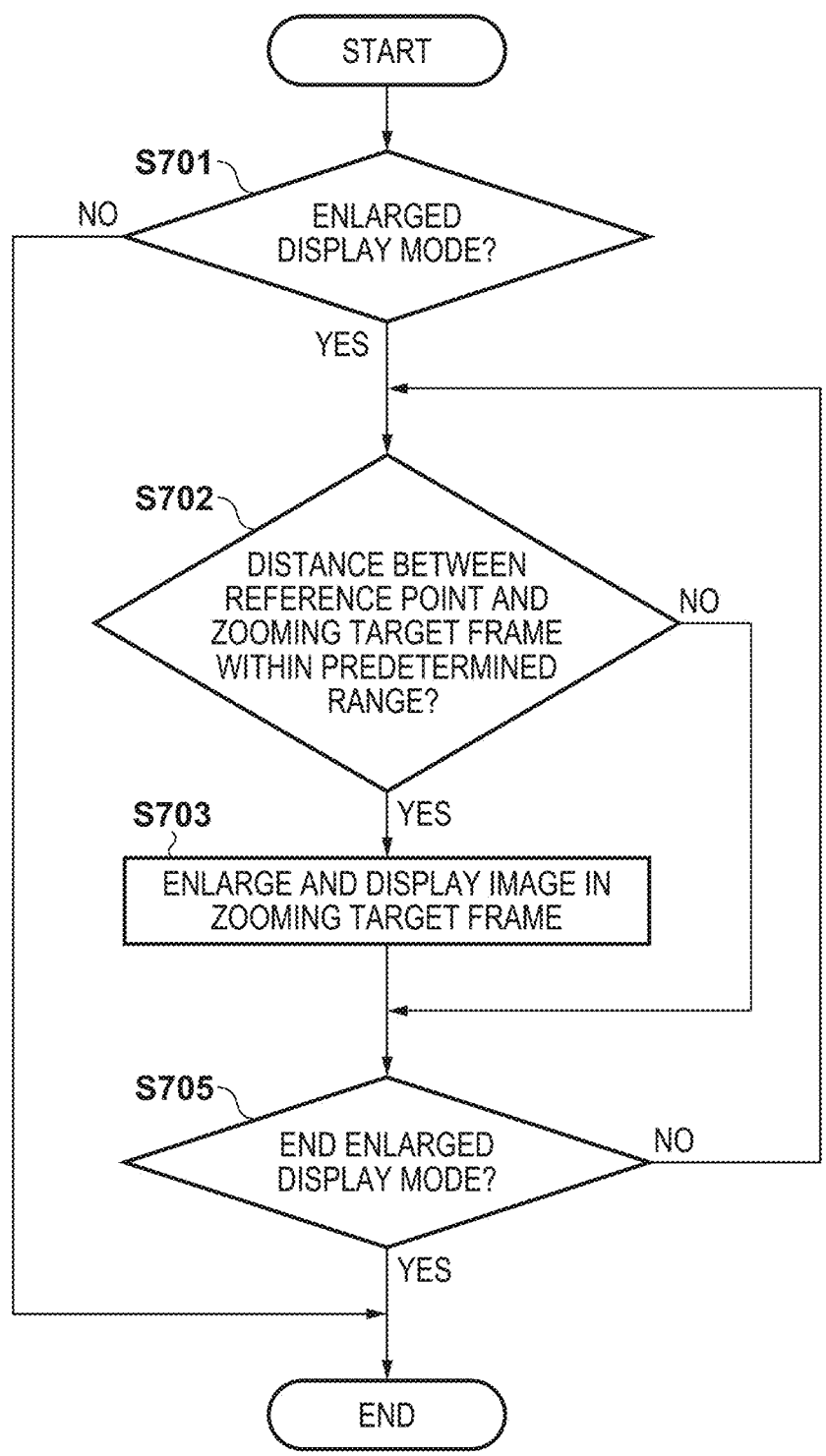

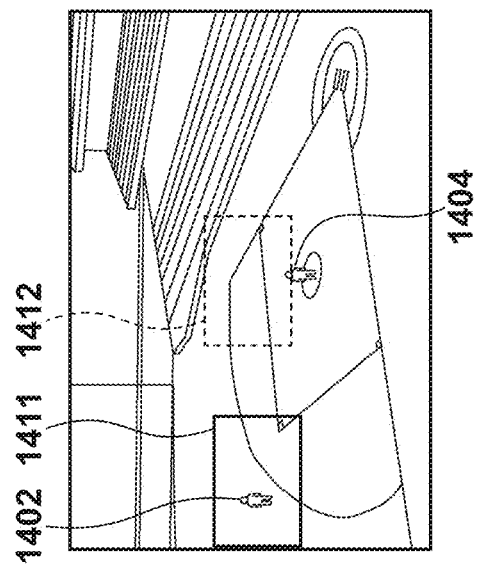
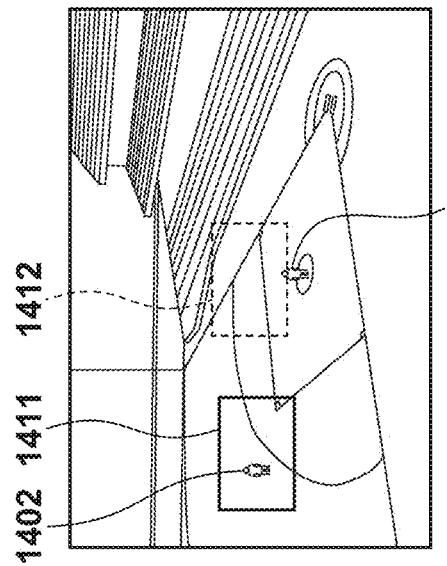
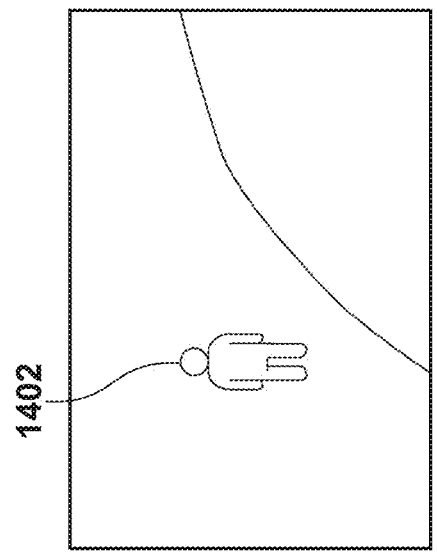
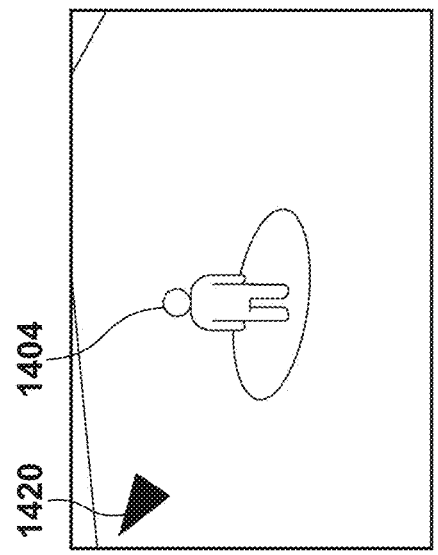

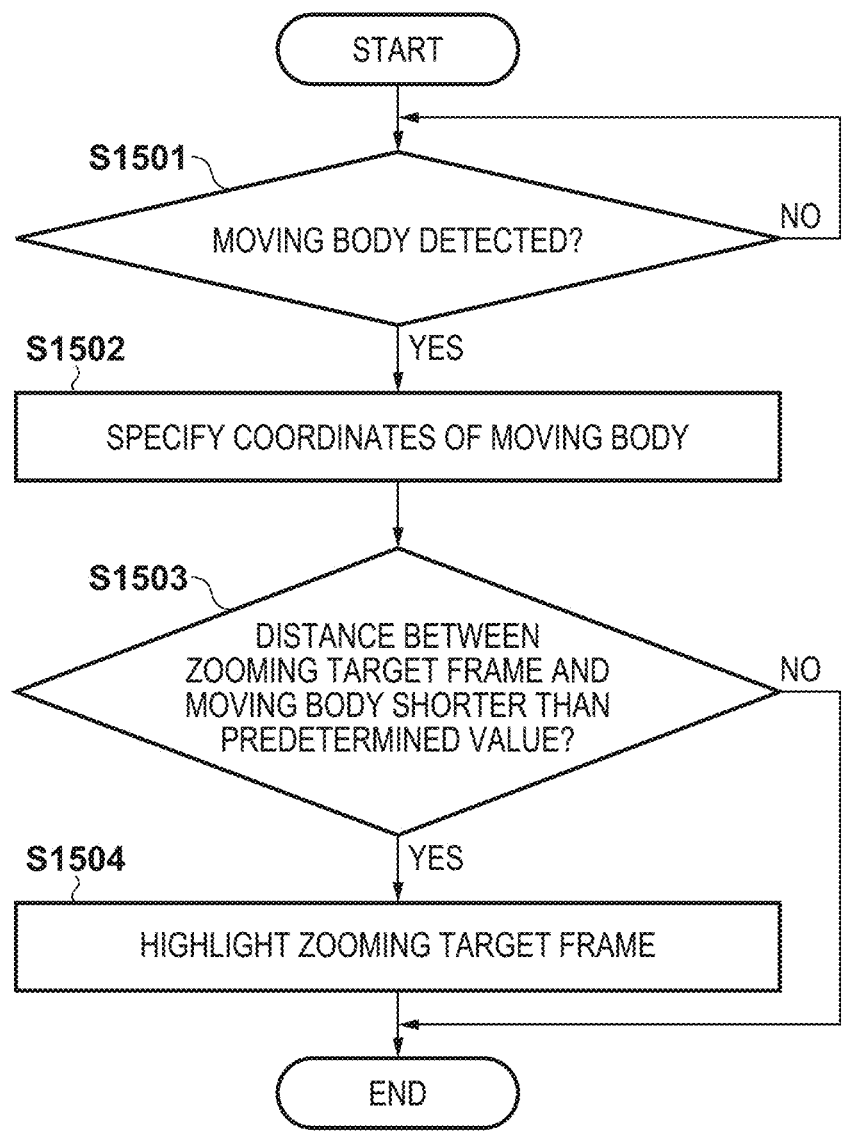

IMAGE CAPTURING APPARATUS AND CONTROL METHOD THEREOF

BACKGROUND OF THE INVENTION

Field of the Invention

The aspect of the embodiments relates to an image capturing apparatus and control method thereof and, more particularly to, a technique for controlling display on a display unit.

Description of the Related Art

Conventionally, in an image capturing apparatus such as a digital camera, by using a display device such as an optical viewfinder that displays an optical image formed by an optical system, an electronic viewfinder or a liquid crystal display that displays image data converted by an image sensor, the shooting composition can be determined. At that time, if an angle of view is narrow, as in a case of telephoto shooting, a photographer may temporarily stop viewing the viewfinder or change the zoom magnification of the lens to the wide-angle side in order to grasp the overall scene, then operate the camera to the telephoto side and decide the shooting composition.

In such a case, a function has been proposed that assists in determining the shooting composition in the telephoto side. For example, Japanese Patent No. 4609315 discloses an image capturing apparatus that superimposes and displays a frame indicating an angle of view corresponding to a zoom magnification on a live view image displayed on a display device before actually performing a zoom operation.

Further, there is known an image capturing apparatus which is provided with a sub-imaging unit for capturing a wide-angle image for assisting framing, in addition to a main imaging unit for recording. For example, Japanese Patent Laid-Open No. 2008-96582 discloses a technique of displaying in a wide-angle image captured by a sub-imaging unit a display indicating an area corresponding to the angle of view of the main imaging unit.

The techniques disclosed in Japanese Patent No. 4609315 and Japanese Patent Laid-Open No. 2008-96582 are effective for confirming the angle of view during telephoto shooting and framing the same subject. However, in the case of performing telephoto shooting while switching between specific shooting compositions, the photographer is to search for each shooting composition for the telephoto shooting from a wide-angle image each time the shooting composition is switched. Therefore, it is not easy to smoothly change the shooting compositions in the telephoto shooting, and the photographer may miss a shooting chance.

SUMMARY OF THE INVENTION

According to the aspect of the embodiments, provided is an apparatus comprising: an sensor that performs photoelectric conversion on light formed by an optical system and outputs a resultant image; a control unit that controls the optical system and the sensor; a display control unit that performs control for displaying the image output from the sensor on a display unit; and memory that stores a first image output from the sensor in a state that the optical system is controlled to a first focal length, wherein the display control unit controls to display, on a second image output from the sensor in a state that the optical system is controlled to a second focal length which is shorter than the first focal length, a shooting frame indicating an area in which the second image and the first image coincide, and wherein each unit is implemented by one or more processors, circuitry or a combination thereof.

Further, according to another aspect of the embodiments, provided is an apparatus comprising: a first sensor that performs photoelectric conversion on light formed by a first optical system and outputs a resultant first image; a second sensor that performs photoelectric conversion on light formed by a second optical system whose focal length is shorter than that of the first optical system and outputs a resultant second image; a control unit that controls the first and second optical systems; a display control unit that performs control for displaying the first image and the second image on a display unit; memory that stores the first image shot under predetermined conditions and shooting information of the first image; and a selection unit that selects either of the first image or the second image to be displayed on the display unit, wherein the display control unit controls to display on the second image a first shooting frame indicating an area in which the second image and the first image stored in the memory coincide and a second shooting frame indicating an area in which the second image and the first image being output from the first sensor coincide in a case where the second image is selected by the selection unit, and wherein each unit is implemented by one or more processors, circuitry or a combination thereof.

Furthermore, according to another aspect of the embodiment, provided is a control method of controlling an apparatus having a sensor that performs photoelectric conversion on light formed by an optical system and outputs a resultant image, comprising: storing in memory a first image output from the sensor in a state that the optical system is controlled to a first focal length; and displaying, on a second image output from the sensor in a state that the optical system is controlled to a second focal length which is shorter than the first focal length, a shooting frame indicating an area in which the second image and the first image coincide.

Further features of the disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

FIG. 4 is a schematic diagram showing a variation of the method of displaying zooming target frames according to the first embodiment;

FIG. 7 is a flowchart showing display control processing using a zooming target frame according to the third embodiment;

FIGS. 14A to 14D are schematic diagrams showing an example of displayed images according to the sixth embodiment;

FIG. 15 is a flowchart showing display control processing using a zooming target frame according to the seventh embodiment;

DESCRIPTION OF THE EMBODIMENTS

Figure 1:
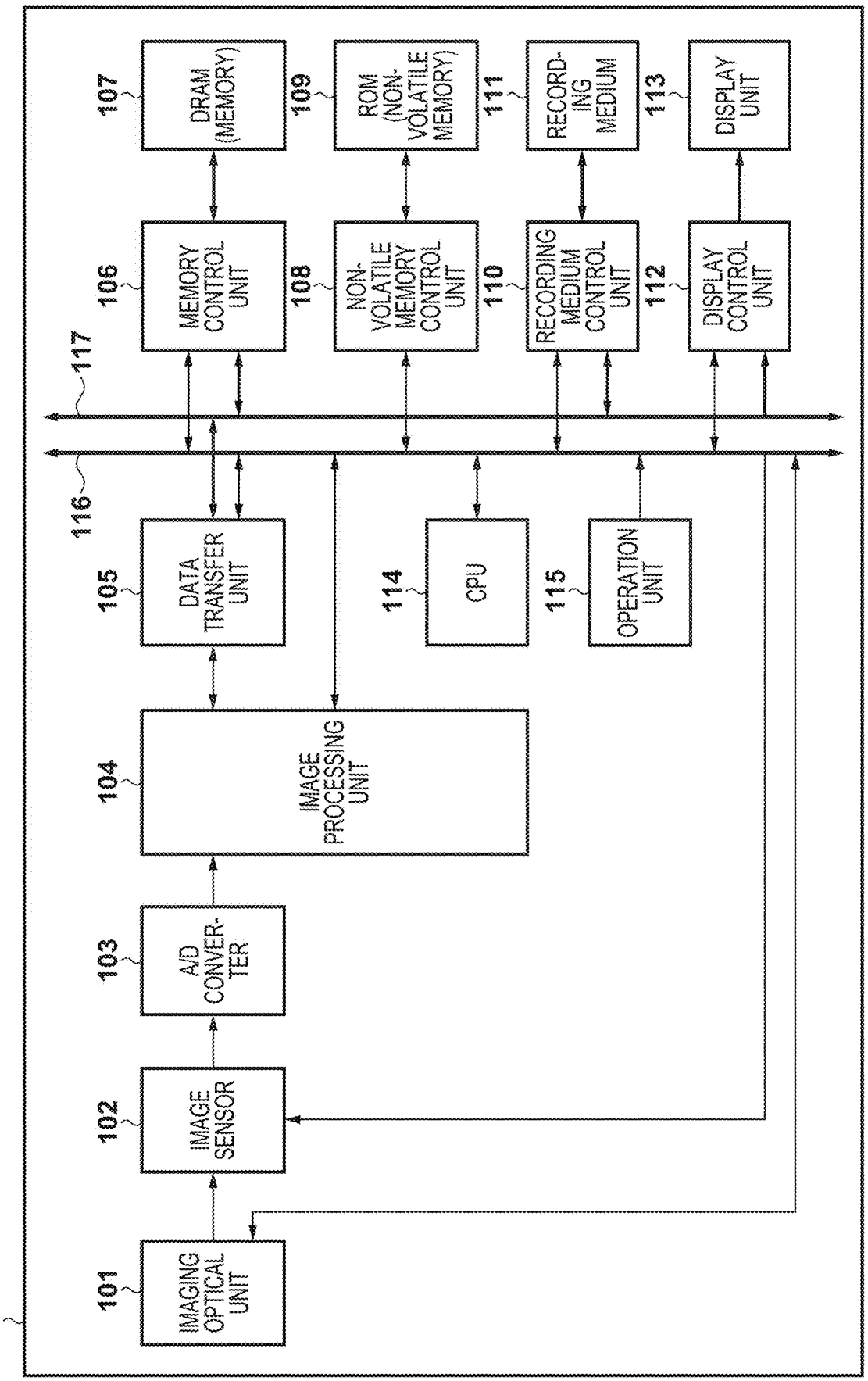
FIG. 1 is a block diagram showing a configuration of a digital camera according to first to seventh embodiments of the disclosure.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Configuration of Image Capturing Apparatus

FIG. 1 is a block diagram showing the configuration of a digital camera 100 which is an image capturing apparatus according to a first embodiment of the disclosure. In FIG. 1, an imaging optical unit 101 includes a diaphragm and a lens group including a plurality of lenses including a zoom lens, a focus lens, and an image stabilization lens. At the time of shooting, the imaging optical unit 101 changes the focal length, performs focus adjustment, exposure adjustment, image stabilization, and the like, and forms an optical image on an image sensor 102. The image sensor 102 has a photoelectric conversion function of converting an optical image into an electric signal (analog image signal), and is composed of a CCD, a CMOS sensor, or the like. An A/D converter 103 converts the analog image signal from the image sensor 102 into a digital image signal. The converted image data is input to an image processing unit 104 provided downstream of the A/D converter 103.

The image processing unit 104 is composed of various image processing units, buffer memory, etc., and appropriately performs processing such as correction processing of chromatic aberration of magnification, development processing, noise reduction processing, geometric deformation processing, and resizing processing such as enlargement/reduction processing, on the image data. In addition, the image processing unit 104 also includes an imaging correction unit that appropriately performs pixel correction, black level correction, shading correction, defective pixel correction, and the like on the image data converted by the A/D converter 103.

A bus 116 is a system bus mainly for transmitting control signals from a CPU 114 and the like to each block, and a bus 117 is a data bus mainly for transferring image data.

The CPU 114 is configured with a microcomputer or the like that controls the entire digital camera 100, issues operation instructions to each block, and executes various control processes. In addition, it also performs calculations required for the various control processes. The CPU 114 controls the image processing unit 104, a data transfer unit 105, a memory control unit 106, a non-volatile memory control unit 108, a recording medium control unit 110, a display control unit 112, an operation unit 115, and the image sensor 102 via the bus 116. The microcomputer realizes each process of the present embodiment by executing the program recorded in ROM 109. Furthermore, the CPU 114 controls the lenses and diaphragm of the imaging optical unit 101 and acquires information such as the focal length.

The data transfer unit 105 is composed of a plurality of DMACs (Direct Memory Access Controllers) that transfer data.

DRAM (memory) 107 is a memory for storing data, and has a storage capacity sufficient to store a predetermined number of still images, a moving image for a predetermined time, audio data, constants for operating the CPU 114, programs, and the like. The memory control unit 106 writes/reads data to/from the DRAM 107 according to an instruction from the CPU 114 or the data transfer unit 105.

The non-volatile memory control unit 108 writes and reads data to and from a ROM (nonvolatile memory) 109 according to an instruction from the CPU 114. The ROM 109 is an electrically erasable/recordable memory, and an EEPROM or the like is used. The ROM 109 stores constants for operating the CPU 114, programs, and the like.

A recording medium 111 is a recording medium such as an SD card and is controlled by the recording medium control unit 110, and image data is recorded on the recording media 111 and recorded data is read out from the recording media 111.

A display unit 113 is comprised of a liquid crystal display, an electronic viewfinder, or the like, and is controlled by the display control unit 112 to display various image data transferred from the image processing unit 104, a menu screen, and the like. Further, before the still image shooting or at the time of moving image shooting, the live view is realized by displaying the image data input from the A/D converter 103 and processed by the image processing unit 104 in real time.

The operation unit 115 includes switches, buttons, a touch panel, etc., operated by a user and is used for various operations including power ON/OFF and shutter ON/OFF. The operation unit 115 also includes a zoom operation member such as a switch, button, or zoom ring for giving instructions to change the focal length, and the zoom lens of the imaging optical unit 101 is moved along the optical axis according to the operation of the zoom operation member.

Method of Setting the Zooming Target Area

Figure 2A:
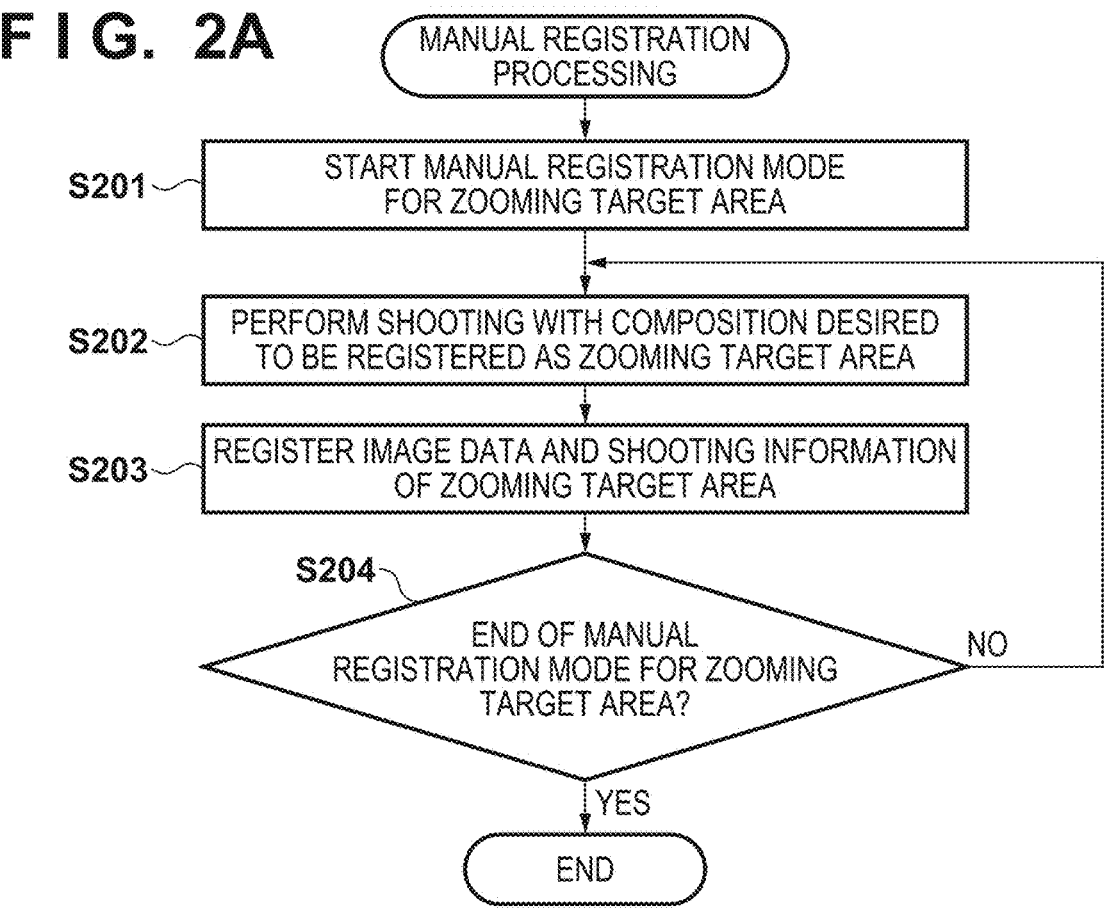
FIG. 2A is a flowchart showing manual registration processing of a zooming target area according to the first embodiment.
Figure 2B:
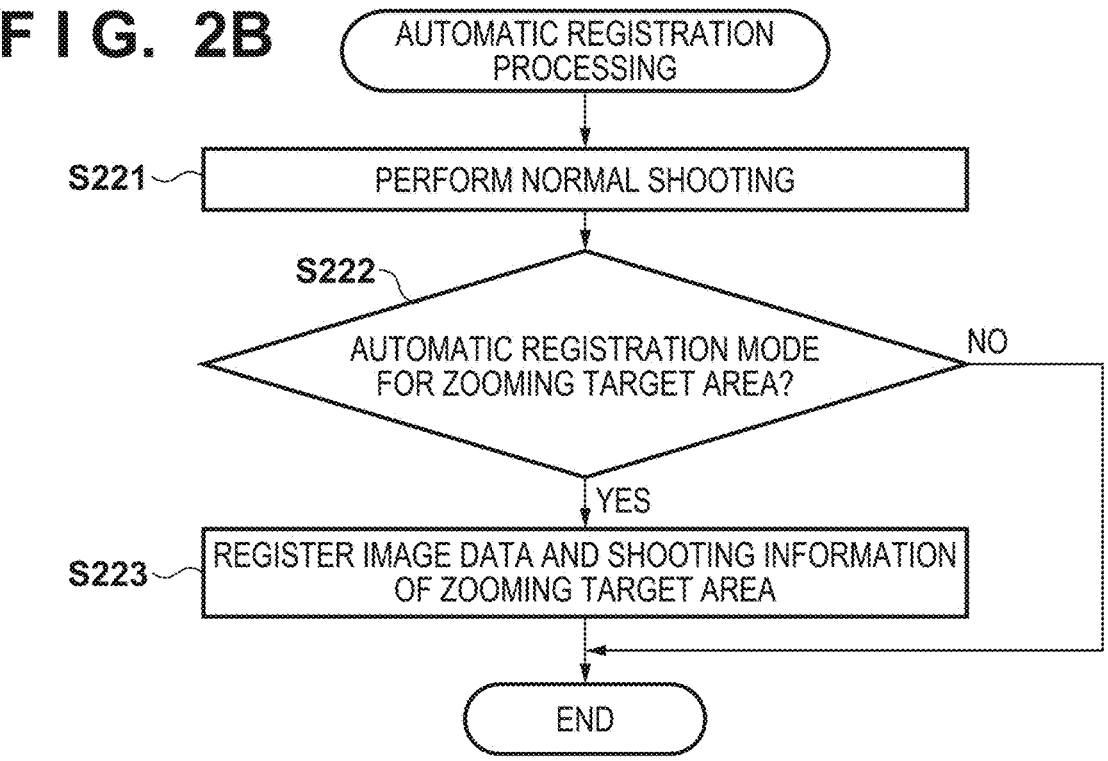
FIG. 2B is a flowchart showing automatic registration processing of a zooming target area according to the first embodiment.

Next, a method of setting the zooming target area in the first embodiment will be described. FIG. 2A is a flowchart of manual registration processing in which a user specifies and registers a zooming target area, and FIG. 2B is a flowchart of automatic registration processing for automatically registering a zooming target area based on a history of a plurality of images captured while the registration mode is set.

First, the manual registration processing will be described in detail with reference to FIG. 2A. In step S201, when the user selects a manual registration mode for performing the manual registration processing of a zooming target area from the operation unit 115 in order to register a zooming target area, the process is started and proceeds to step S202.

In step S202, the user determines the composition and then presses the shutter button, which is a part of the operation unit 115, in the same manner as in actual shooting, to perform shooting, and the process proceeds to step S203.

In step S203, the image data captured in step S202 and shooting information are ultimately recorded in the recording medium 111 by the recording medium control unit 110 via the image processing unit 104, the CPU 114, and so on, and registered as a zooming target area. When the registration of the zooming target area is completed in step S203, the process proceeds to step S204. Note that the shooting information recorded here includes the focal length when the zooming target area was shot, the shooting date and time, and the shooting position.

In step S204, the user determines whether to end the manual registration mode, and if so, the manual registration processing of the zooming target area is ended. On the other hand, if the user decides to continue the registration of the zooming target area, steps S202 and S203 are repeated to continue the registration of the zooming target area. It should be noted that the number of zooming target areas to be registered can be freely decided by the user within the maximum number allowed by the system.

Next, the automatic registration processing will be described in detail with reference to FIG. 2B. In step S221, the user shoots a target subject with arbitrary settings and compositions as usual. When the shooting is completed, the process proceeds to step S222.

In step S222, the CPU 114 determines whether or not an automatic registration mode for registering a zooming target area based on the shooting history is set by the operation of the operation unit 115 by the user. If the automatic registration mode is set, the process proceeds to step S223, and if not, the process ends.

In step S223, the image data captured in step S221 and shooting information are recorded in the recording medium 111 as normal shooting data, and are also registered as a zooming target area as in step S203. When the registration of the zooming target area is completed in step S223, the automatic registration processing ends.

Method of Displaying Zooming Target Frames

Next, display processing of superimposing a zooming target frame indicating the zooming target area registered as described above with reference to FIGS. 2A and 2B at a corresponding position in a live view image displayed on the display unit 113 in the first embodiment will be described in detail with reference to FIG. 2C.

In step S231, the CPU 114 determines whether or not it is set to display the zooming target frames corresponding to all the zooming target areas registered by the above-mentioned manual registration processing and automatic registration processing. If the zoom target frames corresponding to all the zooming target areas are set to be displayed, the process proceeds to step S233, and if not, the process proceeds to step S232.

In step S232, the CPU 114 determines whether or not it is set to display only the zooming target frames corresponding to the zooming target areas registered by the manual registration processing. If only the zooming target frames corresponding to the zooming target areas registered by the manual registration processing are set to be displayed, the process proceeds to step S234, and if not, the process proceeds to step S235.

In step S233, the CPU 114 issues an instruction to the recording medium control unit 110 to read out image data and shooting information of both the zooming target areas registered in the manual registration processing and the zooming target areas registered in the automatic registration processing from the recording medium 111. Then, the read image data and shooting information are expanded on the DRAM 107 via the memory control unit 106.

The number of image data and shooting information of the zooming target areas registered by the manual registration processing to be read out is the number of registrations determined by the user at the time of registration. Further, the number of image data and shooting information of the zooming target areas registered by the automatic registration processing to be read out is determined based on the maximum number for displaying the shooting target areas, shooting date/time information, shooting position information, and the like. For example, the maximum number for displaying the zooming target frames of the image data and shooting information may be read out from the latest shooting history, or among the image data and shooting information whose shooting date and time information indicates the current day and whose shooting position information indicates a position within a specified range from the current position information, the maximum number for displaying the zooming target frames of the image data and shooting information may be read out.

When the read-out processing of the image data and shooting information of the zooming target areas registered by the manual registration processing and the zooming target area registered by the automatic registration processing is completed, the processing proceeds to step S236.

On the other hand, in step S234, the CPU 114 issues an instruction to the recording medium control unit 110 to read out the image data and shooting information of the zooming target areas registered by the manual registration processing from the recording medium 111 as in step S233. Then, the read image data and shooting information are expanded on the DRAM 107 via the memory control unit 106. When the reading out of the image data and shooting information of the zooming target areas registered by the manual registration processing is completed, the process proceeds to step S236.

Further, in step S235, the CPU 114 issues an instruction to the recording medium control unit 110 to read out the image data and shooting information of the zooming target areas registered by the automatic registration processing from the recording medium 111 as in step S233. Then, the read image data and shooting information are expanded on the DRAM 107 via the memory control unit 106. When the reading out of the image data and shooting information of the zooming target areas registered by the automatic registration processing is completed, the process proceeds to step S236.

In step S236, the CPU 114 calculates the display size of a zooming target frame based on the focal length information included in the shooting information of the zooming target area read out in any of steps S233, S234, and S235, and the current focal length used for capturing the live view image. More specifically, the CPU 114 converts a ratio between the focal length of the zooming target area and the current focal length to a ratio in terms of the angle of view, and determines the display size of the zooming target frame in the live view image. When the calculation of the display size of the zooming target frame is completed, the process proceeds to step S237.

In step S237, the image processing unit 104 detects the display position of the zooming target frame based on the image data of the zooming target area read out in any of steps S233, S234, and S235 and the live view image data. The display position of the zooming target frame is detected by detecting the area corresponding to the image data of the zooming target area from the live view image data, and a method of performing template matching processing on the image data may be used.

In the template matching, first, the image data of the zooming target area is resized based on the ratio of the angle of view of the zooming target area with respect to the angle of view of the live view image calculated in step S236. Next, let the image data of the resized zooming target area be as a target image and the image data of the live view image be as a reference image, the target image is used as the template block, and the correlation between the distribution of pixel values in the template block and the distribution of pixel values within a range having a size of the template block in the reference image is obtained at each position of the reference image. At this time, the position where the correlation is highest in the reference image is the corresponding position of the template block, which is the display position of the zooming target frame in the live view image. The entire zooming target area does not necessarily have to be included in the live view image, and the state in which a partial area of the zooming target area is included in the live view image may be detected in the processing in step S237. When the detection of the display position of the zooming target frame is completed, the process proceeds to step S238.

In step S238, the CPU 114 determines whether or not the display position of the zooming target frame is detected in the live view image. Since the detection result output from the image processing unit 104 in the process of step S237 is the highest correlation value by the template matching, it is output even when the corresponding position does not actually exist in the live view image. Therefore, in the process of step S238, the CPU 114 compares the correlation value output from the image processing unit 104 with a threshold, for example, and determines that the display position of the zooming target frame is detected in the live view image in a case where a highly reliable result is obtained. If the display position of the zooming target frame is detected in the live view image, the process proceeds to step S239, and if not detected, the process proceeds to step S240.

In step S239, the CPU 114 issues an instruction to the display control unit 112 to superimpose the zooming target frame, which is determined in step S238 to be displayable in the live view image, on the live view image and display it on the display unit 113.

Figure 3A:
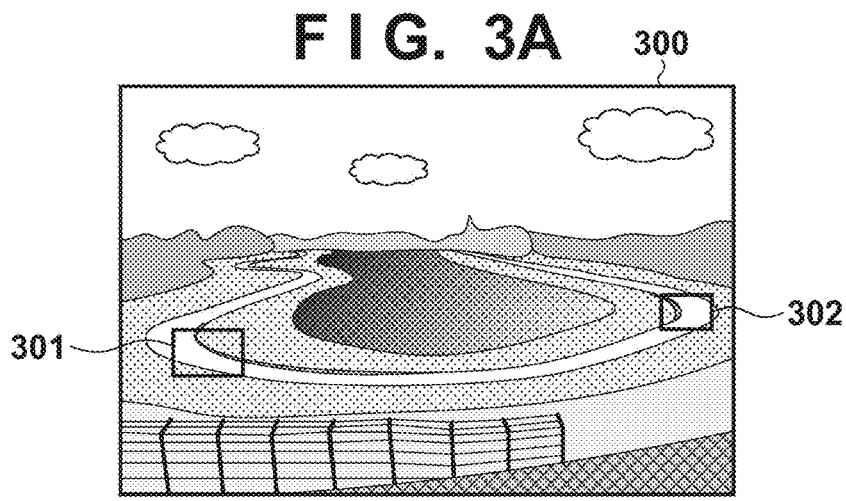
FIGS. 3A to 3G are schematic diagrams showing a method of displaying zooming target areas according to the first embodiment.
Figure 3B:
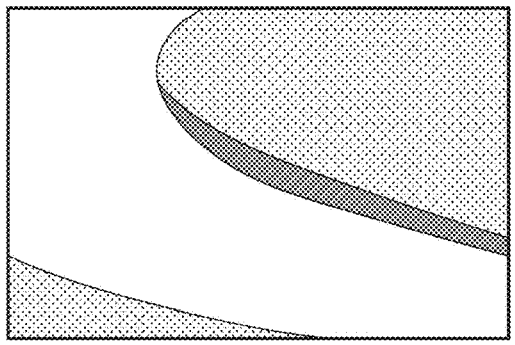
Figure 3C:
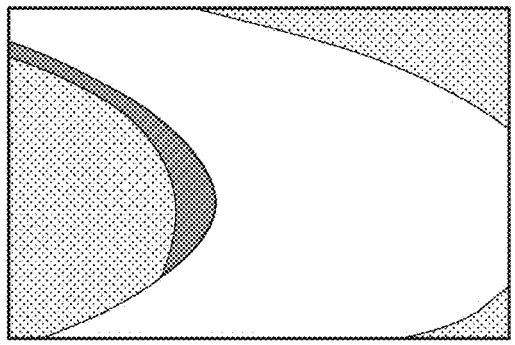

Here, the display state of the zooming target frame will be described with reference to FIGS. 3A to 3G. FIGS. 3A to 3G are schematic diagrams showing display examples in a case where a zooming target frame is displayed on a live view image. FIG. 3A shows a live view image 300 displayed on the display unit 113 captured with a focal length being set to the wide-angle end. FIG. 3B and FIG. 3C show examples of images captured by the manual registration processing in advance when no subject exists and registered as the zooming target areas. Based on these registered images, zooming target frames 301 and 302 corresponding to the registered images are displayed in the live view image 300 shown in FIG. 3A.

Figure 3D:
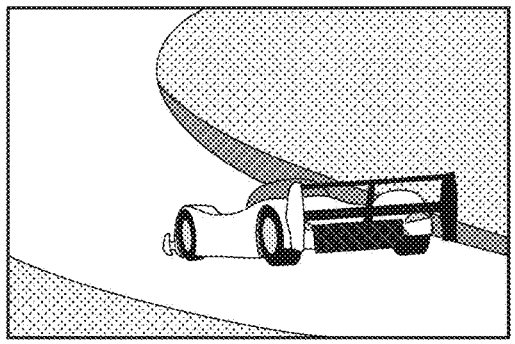
Figure 3E:
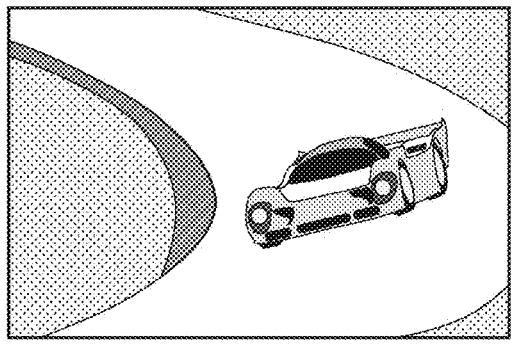

On the other hand, FIG. 3D and FIG. 3E show examples of images recorded by the normal shooting by the user when the automatic registration mode is set. When these images are registered as the zooming target areas, based on these images, the zooming target frames 301 and 302 corresponding to these images are displayed in the live view image 300 shown in FIG. 3A.

Similarly, in a case where the user manually registers the image shown in FIG. 3B as the zooming target area and the image shown in FIG. 3E is automatically registered as the zooming target area, the zooming target frames 301 and 302 corresponding to the registered images are displayed in the live view image 300.

When the display processing of the zooming target frame is completed in step S239, the process proceeds to step S240, where the CPU 114 determines whether or not the display processing of the zooming target frame is completed for all the zooming target areas to be processed. When the display processing of the zooming target frame is completed for all the zooming target areas, the process proceeds to step S241. When the display processing of the zooming target frame is not completed for all the zooming target areas, the process returns to step S236 and steps S236 to S239 are repeated.

In step S241, the CPU 114 determines whether the live view display is ended. For example, when the power switch of the operation unit 115 is turned off by the user, or when a playback button of the recorded image is operated, it is determined that the live view display is ended, and the display processing of the zooming target frame ends. On the other hand, in the case of continuing the live view display, the process returns to step S231 and the processes of steps S231 to S240 are repeated.

Figure 2C:
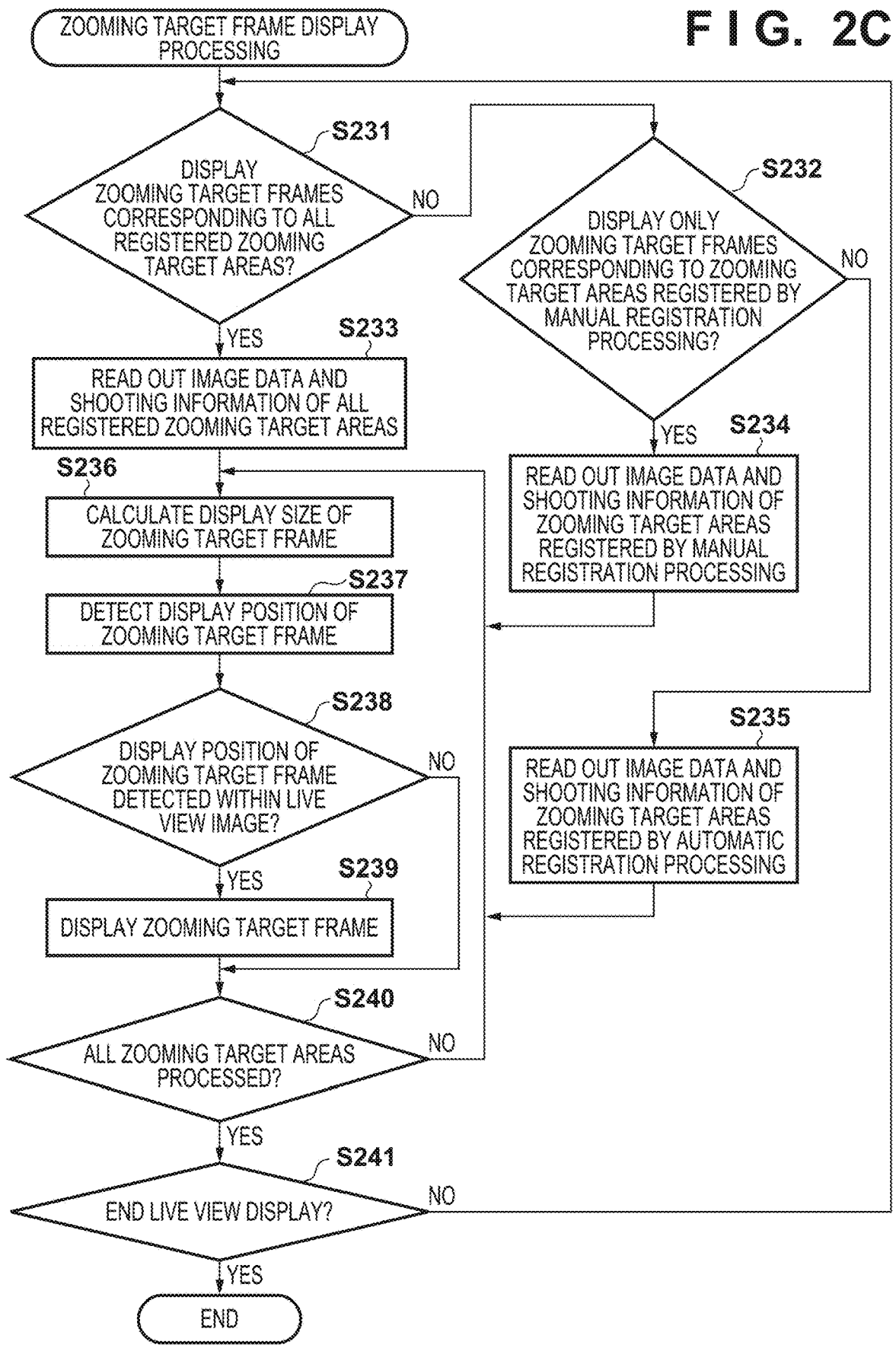
FIG. 2C is a flowchart showing display processing of a zooming target frame according to the first embodiment.
Figure 3F:
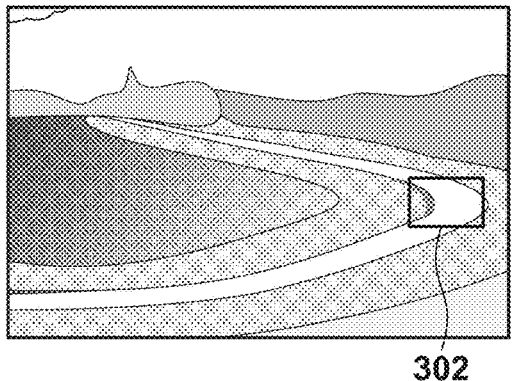
Figure 3G:
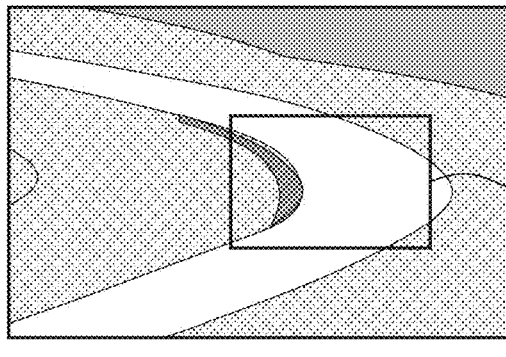

FIGS. 3F and 3G show display examples when the display processing shown in FIG. 2C is continued while the user zooms in.

When attempting to capture an image of the area indicated by the zooming target frame 302 from the state shown in FIG. 3A, the user increases the zoom magnification by using the zoom operation member included in the operation unit 115 and move the angle of view toward the zooming target frame 302. FIG. 3F shows an example of the live view image displayed at this time. FIG. 3G shows an example of the live view image displayed when the zoom magnification is further increased and the angle of view is moved toward the zooming target frame 302. When the zoom magnification is further increased and the angle of view of the live view image matches the zooming target area, an image as shown in FIG. 3C is displayed.

Further, when it is desired to capture an image of the area of the zooming target frame 301 from this state, the zoom magnification is once lowered to display the zooming target frame 301 as shown in FIG. 3A, thereby it becomes possible to move the angle of view to the area of the zooming target frame 301 smoothly.

As described above, by superimposing on a live view image, displayed on a display device, a zooming target frame corresponding to a registered zooming target area at a corresponding position in the live view image, it is possible to provide a guide for searching for a telephoto shooting composition in a wide angle image. As a result, in the case of repeatedly performing telephoto shooting of an image of a specific area, it is possible to shorten the time for searching for a shooting composition, enable a smooth composition change, and reduce loss of shooting opportunities.

In addition, in the above-mentioned example, the display examples based on the zooming target area obtained through single shooting is described as the display method of the zooming target frame, but the disclosure is not limited to this. For example, in a case where a plurality of images shot in a continuous shooting mode are registered as zooming target areas, only the zooming target frames, shown as display frames 401 of FIG. 4, corresponding to the first and last images obtained by the continuous shooting are displayed, and an indication implying the continuous shooting may be further displayed. Further, in addition to the zooming target frames corresponding to the first and last images, a plurality of zooming target frames thinned at preset intervals may be displayed as shown by the display frames 402 in FIG. 4 so that the continuous shooting can be recognized.

Furthermore, zooming target areas obtained by moving image shooting may be represented in the same manner as the zooming target areas obtained by the continuous shooting. Also, in the case where a larger number of zooming target areas having the similar spatial or temporal characteristics are registered as indicated by dotted frames near a frame 403 in FIG. 4, if zooming target frames corresponding to all of those zooming target areas are displayed, it may look too crowded. Therefore, in such a case, only the zooming target frame 403 may be representatively displayed using a center of mass of the zooming target areas, for example.

Further, although an example in which the CPU 114 performs the processing has been described in the present embodiment, dedicated hardware may be used to perform the processing.

Second Embodiment

Next, a second embodiment of the disclosure will be described. An image capturing apparatus according to the second embodiment is the same as that described with reference to FIG. 1, and thus the description thereof is omitted here.

Method of Setting the Zooming Target Area

Figure 5A:
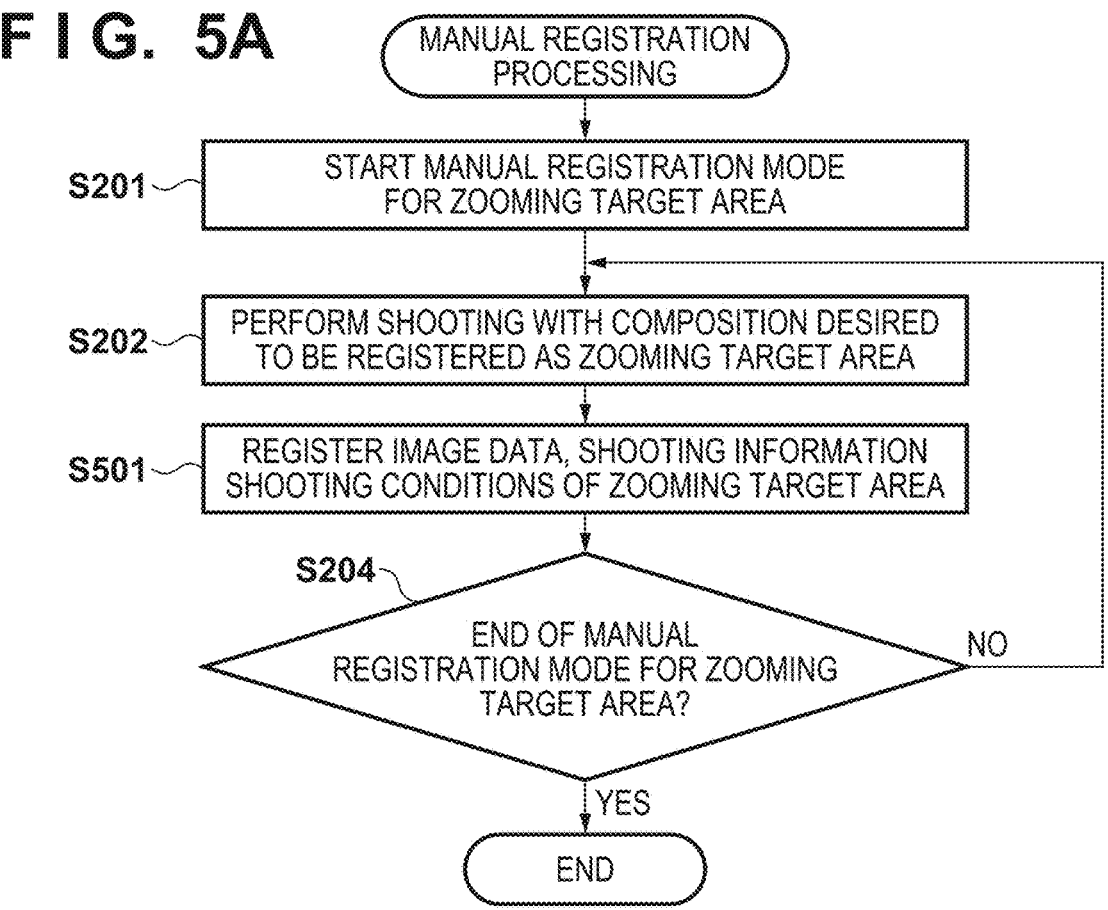
FIG. 5A is a flowchart showing manual registration processing of a zooming target area according to the second embodiment.
Figure 5B:
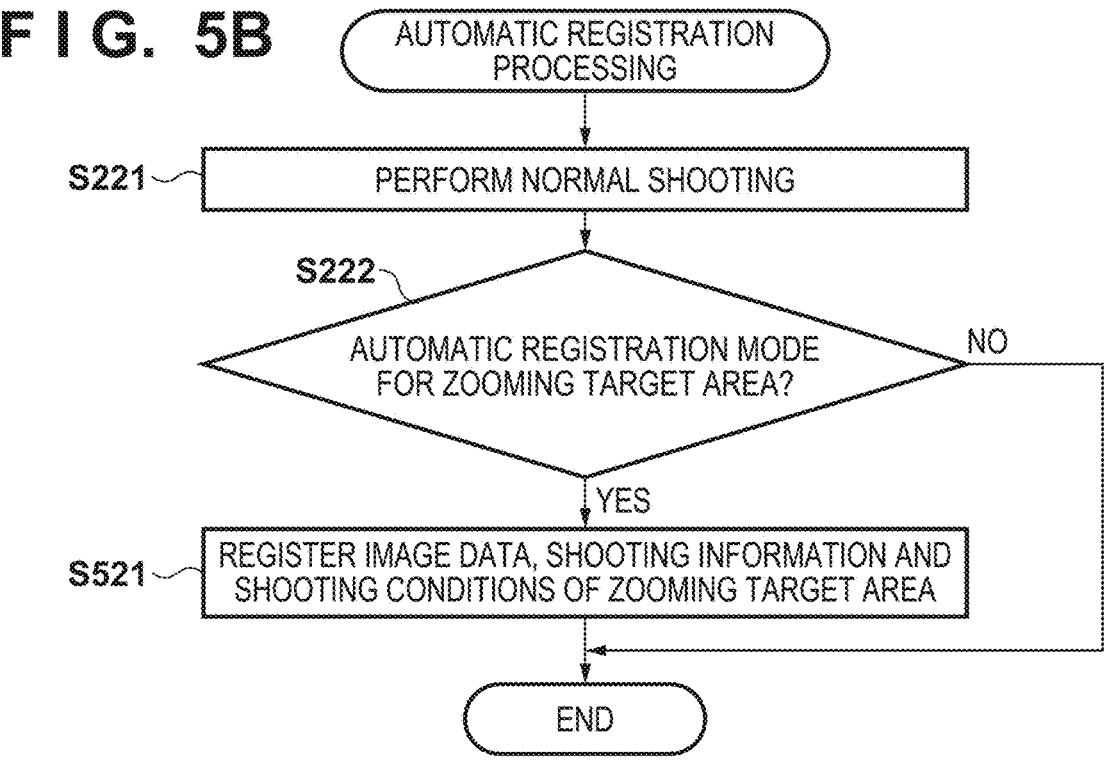
FIG. 5B is a flowchart showing automatic registration processing of a zooming target area according to the second embodiment.

FIG. 5A is a flowchart of manual registration processing in the second embodiment, and FIG. 5B is a flowchart of automatic registration processing in the second embodiment. In FIGS. 5A and 5B, the same steps as those in FIGS. 2A and 2B are designated by the same step numbers and description thereof is omitted.

The difference between the processing in FIG. 5A and the processing in FIG. 2A is that the image data and shooting information of the zooming target area is registered in step S203 in FIG. 2A, whereas in step S501 in the second embodiment, shooting conditions are further registered in addition to the image data and shooting information.

Further, the difference between the processing in FIG. 5B and the processing in FIG. 2B is that the image data and shooting information of the zooming target area is registered in step S223 in FIG. 2B, while in step S521 in the second embodiment, shooting conditions are further registered in addition to the image data and shooting information.

Note that the shooting conditions registered in FIGS. 5A and 5B are conditions such as shooting mode, aperture, exposure period, ISO sensitivity, exposure correction, use of flash, use of special effect filter, and type of the special effect filter.

Method of Displaying Zooming Target Frames

Next, display processing of superimposing a zooming target frame indicating the zooming target area registered as shown in FIGS. 5A and 5B at a corresponding position in a live view image displayed on the display unit 113 in the second embodiment will be described in detail with reference to FIGS. 5A to 5E.

Figure 5C:
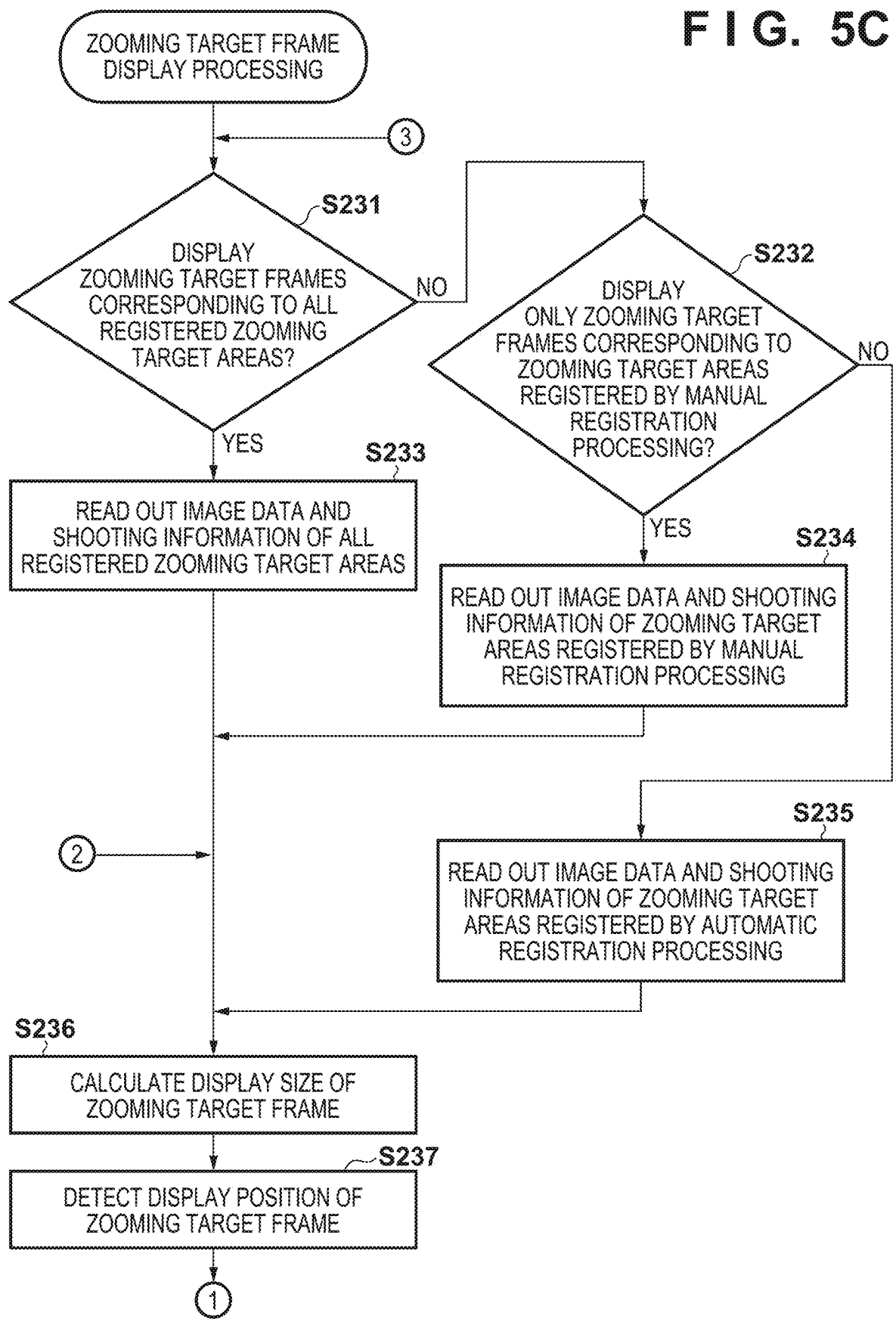
FIG. 5C is a flowchart showing a display processing of a zooming target frame according to the second embodiment.
Figure 5D:
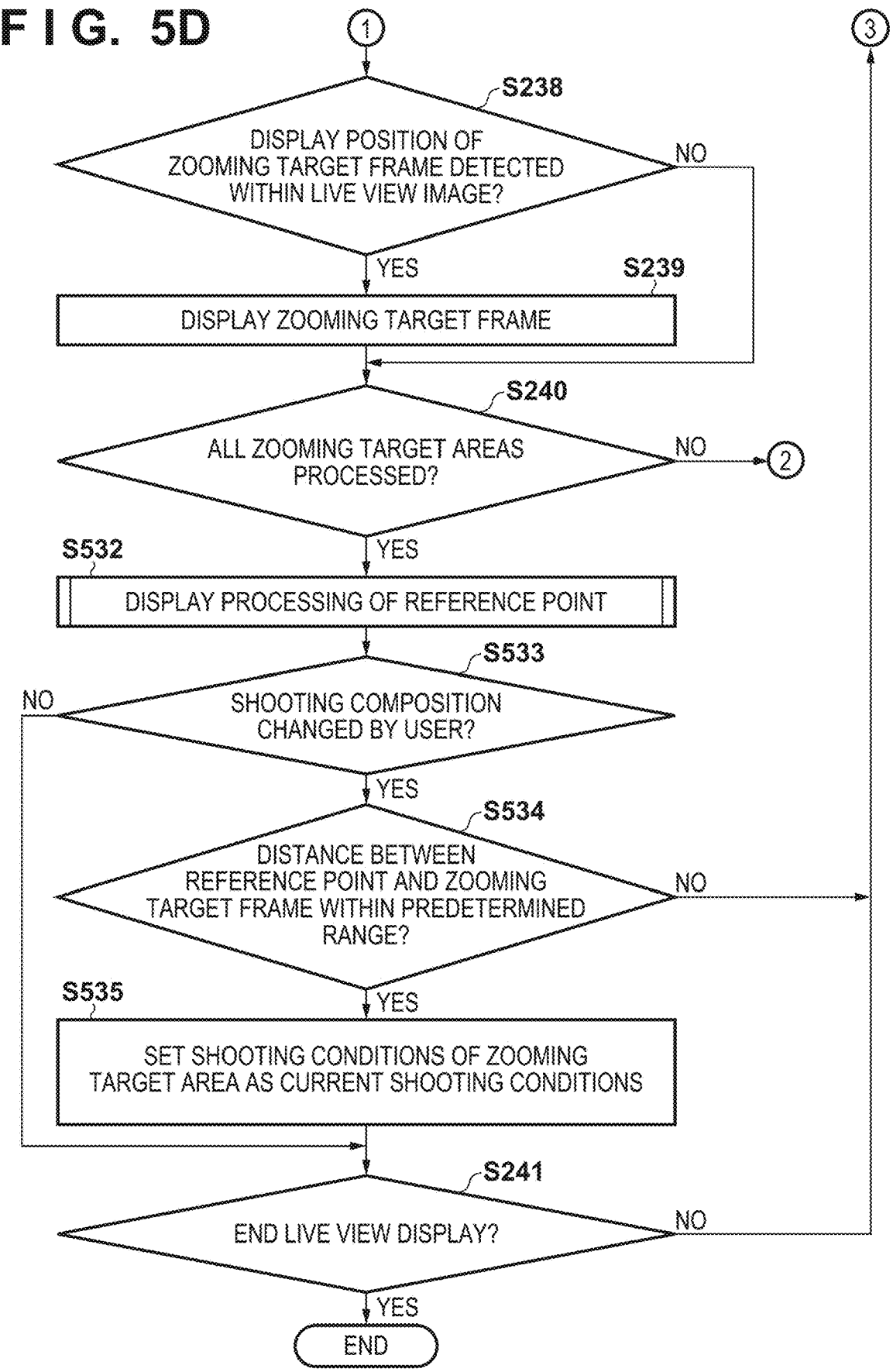
FIG. 5D is a flowchart showing the display processing of a zooming target frame according to the second embodiment.

FIGS. 5C and 5D shows a flowchart of a process of displaying the zooming target frame of the zooming target area registered as shown in FIGS. 5A and 5B and setting the registered shooting conditions to the current shooting conditions. Note that in FIGS. 5C and 5D, the same processes as those in FIG. 2C are denoted by the same reference numerals, and description thereof will be omitted.

First, in steps S231 to S240, the display processing of the zooming target frame described in the first embodiment with reference to FIG. 2C is performed. When the display processing of the zooming target frame is completed, the process proceeds to step S532. In step S532, a process of displaying a reference point for explicitly expressing the positional relationship between the zooming target frame and the live view image which is the current shooting area is performed.

Figure 5E:
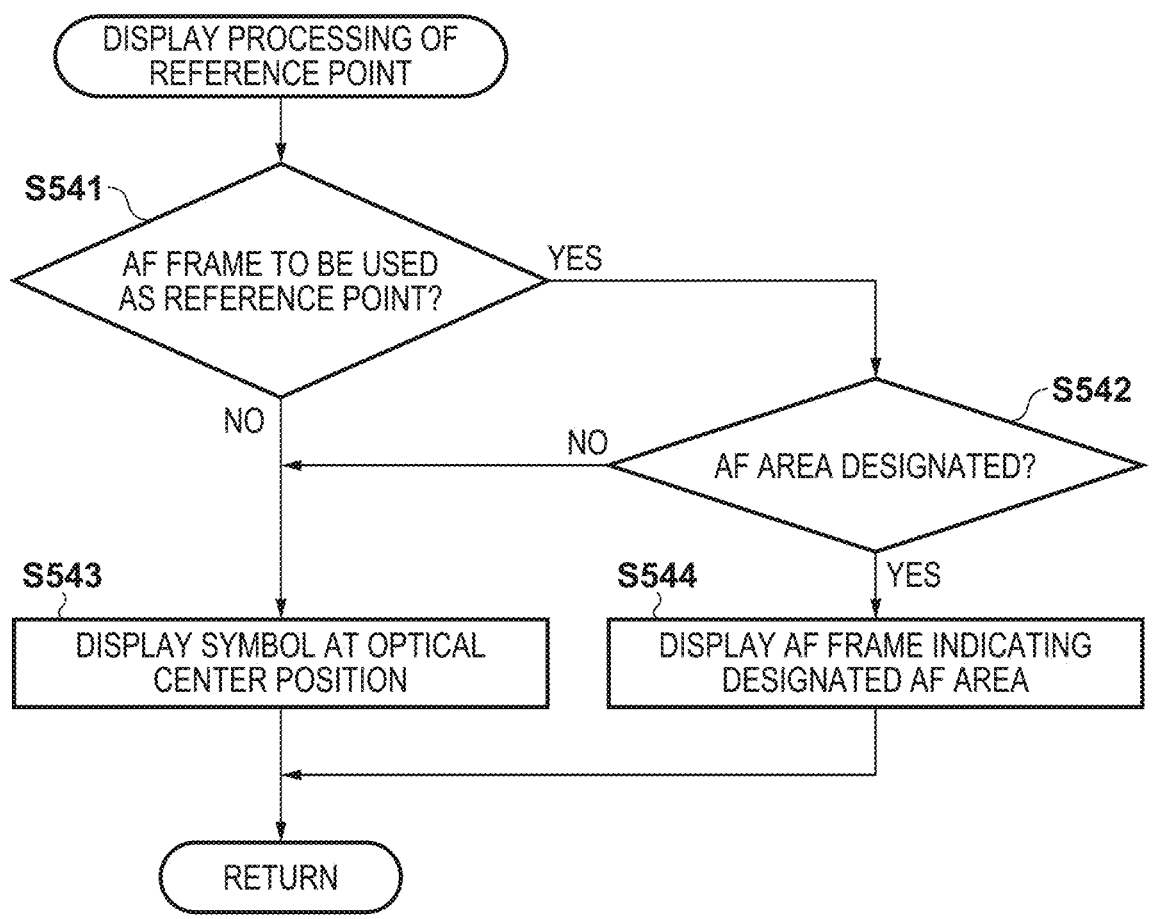
FIG. 5E is a flowchart showing reference point display processing according to the second embodiment.

FIG. 5E is a flowchart of the display processing of the reference point for displaying the reference point performed in step S532. When the display processing of the reference point starts, the CPU 114 determines in step S541 whether or not it is set to use an AF frame as the reference point. If it is set to use the AF frame as the reference point, the process proceeds to step S542. On the other hand, if it is not set to use the AF frame as the reference point, the process proceeds to step S543. Note that the AF frame used here is set at a designated position on the display screen of the display unit 113 regardless of the display content of the live view image displayed on the display unit 113.

In step S542, the CPU 114 further determines whether or not a specific area is designated as the AF area by, for example, automatic selection. If the AF area is designated, the process proceeds to step S544, and if not, the process proceeds to step S543. In step S543, as the AF frame is not set to be used as the reference point or the AF area is not specifically designated, the CPU 114 sets the reference point of the live view image, which is the current shooting area, to the optical center position, and displays a symbol that indicates the reference point. The symbol indicating the reference point may be, for example, a cross mark or a round dot.

On the other hand, in step S544, the CPU 114 determines that, in the live view image that is the current shooting area, the designated AF area is the area in which the user intends to place the main subject, and an AF frame indicating the designated AF area is displayed as the reference point. When the reference point is displayed, the display processing of the reference point ends, and the process proceeds to step S533 in FIG. 5D.

In step S533, it is determined whether or not the user has operated the orientation of the digital camera 100 to change the shooting composition. If not changed, the process proceeds to step S241, and if changed, the process proceeds to step S534.

In step S534, the CPU 114 determines whether the distance between the reference point and the zooming target frame is within a predetermined range. If it is determined that distance is within the predetermined range, the process proceeds to step S535, and if it is determined that the distance is not within the predetermined range, the process proceeds to step S241.

In step S535, the CPU 114 sets the shooting conditions registered in relation to the zooming target area corresponding to the zooming target frame close to the reference point as the current shooting conditions. When the shooting conditions are set, the process proceeds to step S241, and the above-described processes are repeated until the live view display ends.

Figure 6A:
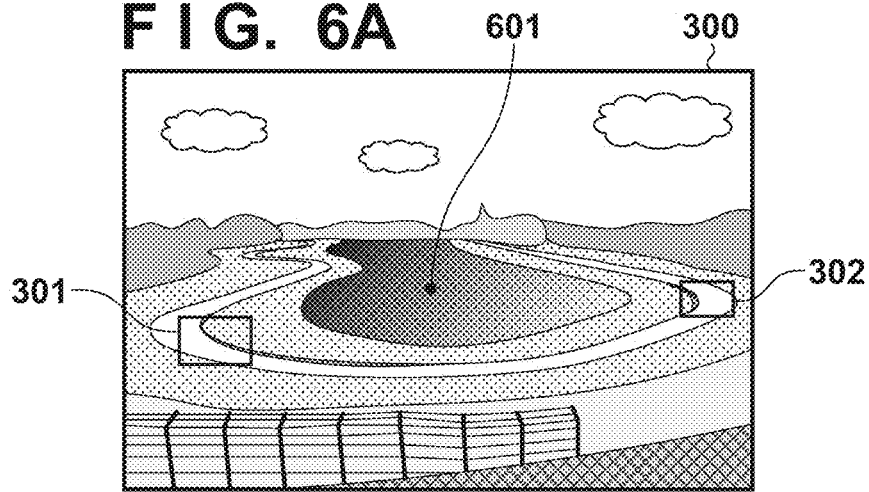
FIGS. 6A to 6C are schematic diagrams showing an example of displayed images and shooting conditions according to the second embodiment.
Figure 6B:
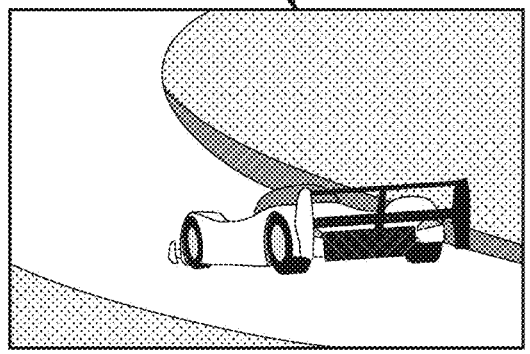
Figure 6C:
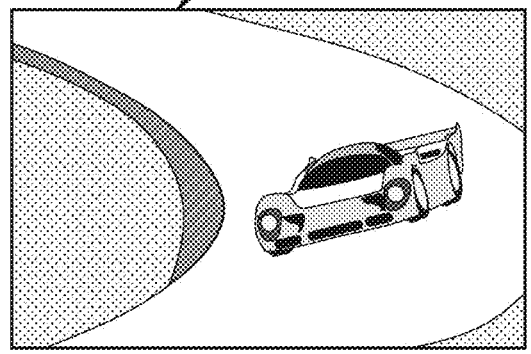

FIGS. 6A to 6C are schematic diagrams showing a display example when the zooming target frames 301 and 302 and the reference point 601 are displayed on the live view image 300, and schematic diagrams showing corresponding shooting conditions.

FIGS. 6B and 6C are images of zooming target areas corresponding to the zooming target frames 301 and 302 displayed on the live view image of FIG. 6A, respectively. In the second embodiment, shooting conditions are also registered as information of the zooming target areas as described above. When the zooming target frame 301 or 302 approaches the reference point 601 as the shooting composition changes, the shooting conditions shown in FIG. 6B or 6C are set as the current shooting conditions.

As described above, the shooting conditions are also registered when the zooming target area is registered. Then, when the reference point of the current shooting area and the zooming target frame approach and the distance between them becomes within a predetermined range, by setting the shooting conditions of the corresponding zooming target area as the current shooting conditions, it is possible to shorten the time since the composition changes until shooting is performed.

Third Embodiment

Next, a third embodiment of the disclosure will be described. An image capturing apparatus according to the third embodiment is the same as that described with reference to FIG. 1, and thus the description thereof is omitted here. Further, in the third embodiment, processing of registering a zooming target area is the same as that described with reference to FIGS. 2A and 2B in the first embodiment or with reference to FIGS. 5A and 5B in the second embodiment, and the description thereof is omitted.

Method of Displaying Zooming Target Frames

Next, display processing of superimposing a zooming target frame at a corresponding position in a live view image displayed on the display unit 113 in the third embodiment will be described in detail with reference to FIG. 7 and FIGS. 8A to 8C.

In the third embodiment, it is assumed that the display processing of the zooming target frame and the reference point described with reference to FIGS. 5C to 5E in the second embodiment is repeatedly performed in a predetermined cycle, for example, every time a live view image is acquired. However, the processes of S533 to S535 are not performed in a case where the shooting conditions are not registered as described with reference to FIGS. 2A and 2B.

Figure 8C:
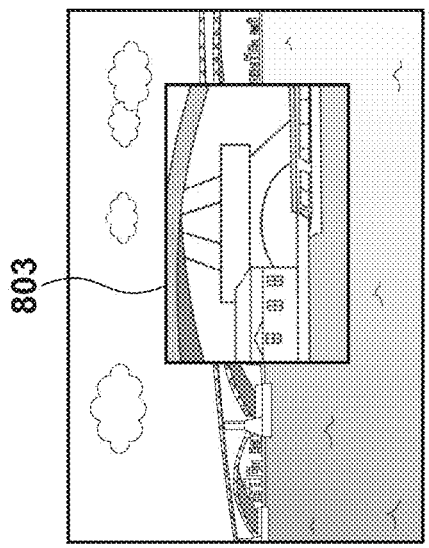
FIGS. 8A to 8C are schematic diagrams showing an example of displayed images according to the third embodiment.
Figure 8B:
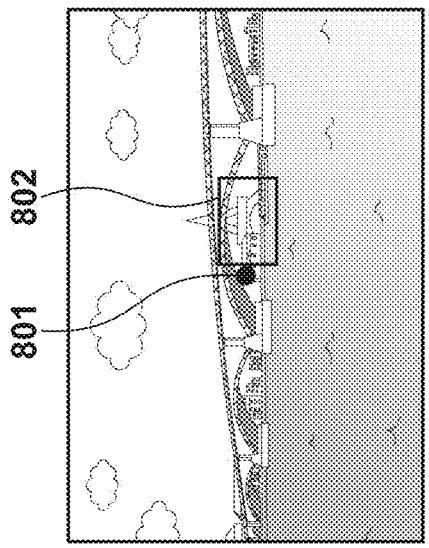
Figure 8A:
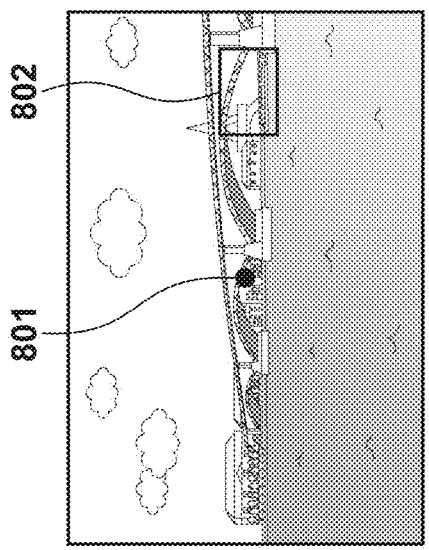

First, in step S701 of FIG. 7, the CPU 114 determines whether or not an enlarged display mode of the zooming target area is instructed by the operation of the operation unit 115. If the enlarged display mode is not instructed, the process ends. In this case, for example, images as shown in FIGS. 8A and 8B are displayed. In FIGS. 8A and 8B, a reference numeral 801 indicates a reference point and a reference numeral 802 indicates a zooming target frame. When the enlarged display mode is instructed, the process proceeds to step S702.

In step S702, the CPU 114 determines whether the shortest distance between the reference point and the zooming target frame is within a predetermined range. Here, the shortest distance between the reference point and the zooming target frame is calculated from coordinates of the display positions of the reference point and the zooming target frame in the live view image, and compared with a predetermined range. If the shortest distance is within the predetermined range, the process proceeds to step S703.

FIG. 8B shows a state immediately before the distance between a reference point 801 and a zooming target frame 802 is determined as within the predetermined range in step S702 when the digital camera 100 is panned to the right from the state shown in FIG. 8A, and the reference point 801 and the zooming target frame 802 approach.

In step S703, the image in the zooming target frame is enlarged and displayed in the live view screen. FIG. 8C shows a display example in a case where the image in the zooming target frame 802 is enlarged and displayed from a state shown in FIG. 8B. Reference numeral 803 denotes a partial image obtained by enlarging the image in the zooming target frame 802. It should be noted that here, electronic zoom is used in the enlargement processing.

On the other hand, if it is determined in step S702 that the distance is not within the predetermined range, the image in the zooming target frame is not enlarged and the process directly proceeds to step S705.

In subsequent step S705, it is determined whether or not the enlarged display mode is ended. If the enlarged display mode is ended in response to the operation of the operation unit 115 by the user, the processing ends, and if the enlarged display mode is not ended, the process returns to step S702.

According to the third embodiment as described above, by enlarging and displaying the image in the zooming target frame in the live view image, it becomes easier for a user to confirm the image displayed in the enlarged display area.

Although the optical center position is displayed as the reference point in the examples shown in FIGS. 8A to 8C, the same effect can be obtained by displaying the AF frame as explained with reference to FIG. 5E. Further, in the above description, whether or not the distance between the reference point 801 and the zooming target frame 802 is within a predetermined range is determined, however, whether or not the reference point 801 and the zooming target frame 802 overlap each other may be determined instead.

Further, in the above example, it is explained that the image in the zooming target frame 802 is enlarged and displayed in a case where the enlarged display mode is set by the operation unit 115. However, the control may be such that the image is always enlarged and displayed when the distance between the reference point 801 and the zooming target frame 802 is within a predetermined range.

Further, as the enlarged display, not the partial area on the display screen as shown in FIG. 8C but the entire screen may be used to display the enlarged image. In addition, upon performing enlarged display, if the image processing of a special processing mode is set as the shooting conditions of the zooming target frame 802, the specially processed image may be enlarged and displayed. For example, when a monochromatic shooting mode is set as the shooting conditions of the special processing mode, an image in the zooming target frame 802 having undergone the monochromatic image processing is enlarged and displayed.

Furthermore, upon performing the enlarged display, the readout method of image from the image sensor 102 may be changed so that the resolution increases. For example, before the enlarged display, adjacent pixel values are added in the image sensor 102 and then read out, and when performing the enlarged display, each pixel value of an image in the zooming target frame 802 is independently read out without being added.

Fourth Embodiment

Next, a fourth embodiment of the disclosure will be described. An image capturing apparatus according to the fourth embodiment is the same as that described with reference to FIG. 1, and thus the description thereof is omitted here. Further, in the fourth embodiment, processing of registering a zooming target area is the same as that described with reference to FIGS. 2A and 2B in the first embodiment or with reference to FIGS. 5A and 5B in the second embodiment, and the description thereof is omitted.

Angle of View Control

Next, angle of view control using the zooming target frame displayed in the live view image on the display unit 113 in the fourth embodiment will be described in detail with reference to FIG. 9 and FIGS. 10A to 10C.

In the fourth embodiment, it is assumed that the display processing of the zooming target frame and the reference point described with reference to FIGS. 5C to 5E in the second embodiment is repeatedly performed in a predetermined cycle, for example, every time a live view image is acquired. However, the processes of S533 to S535 are not performed in a case where the shooting conditions are not registered as described with reference to FIGS. 2A and 2B.

Figure 9:
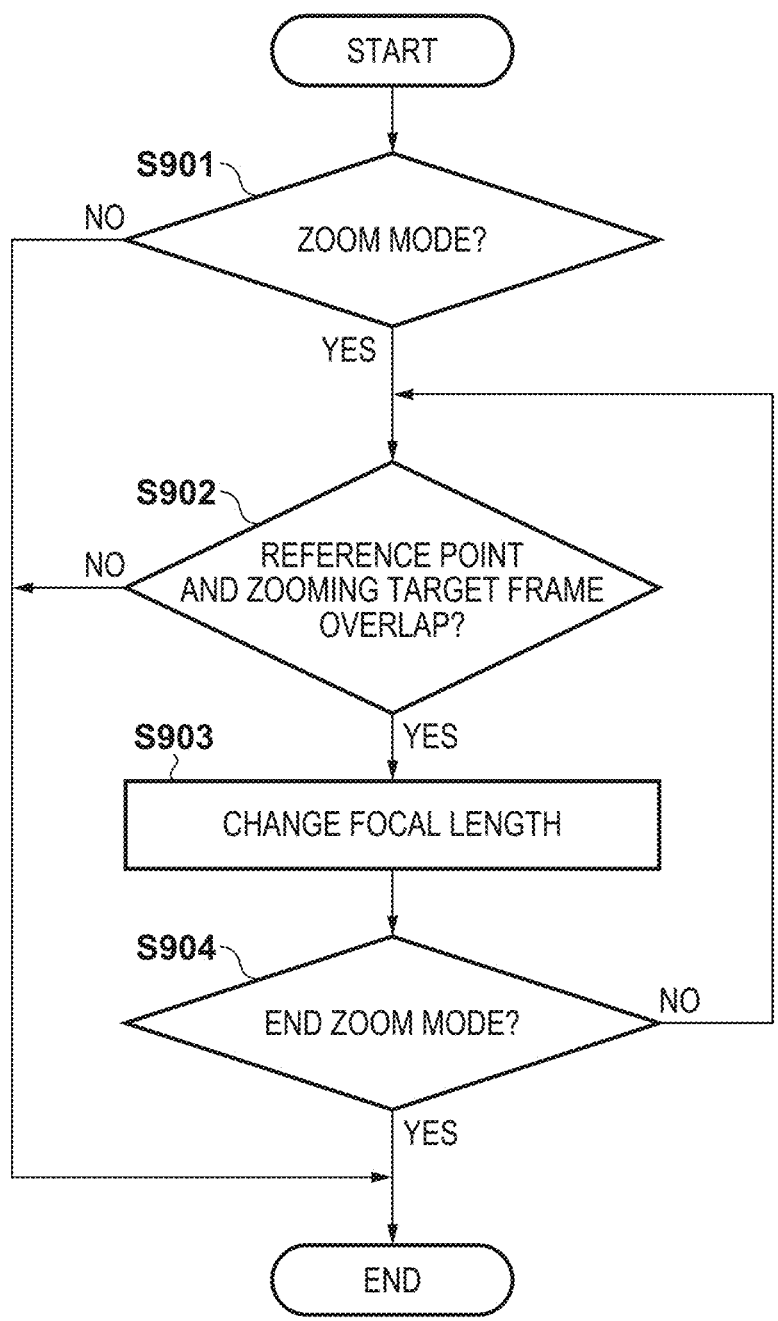
FIG. 9 is a flowchart showing angle-of-view control processing using a zooming target frame according to the fourth embodiment.
Figure 10A:
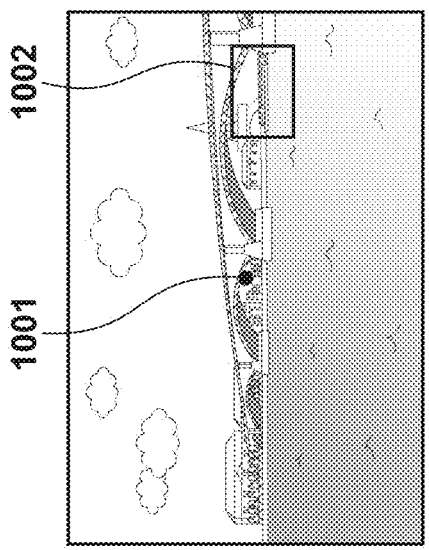
FIGS. 10A to 10C are schematic diagrams showing an example of displayed images according to the fourth embodiment.
Figure 10B:
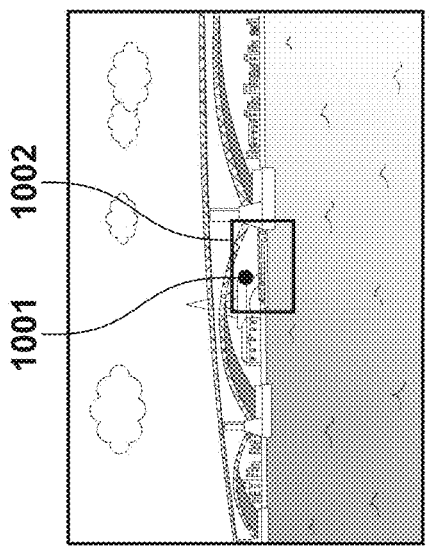

First, in step S901 of FIG. 9, the CPU 114 determines whether or not a zoom mode is instructed by the operation of the operation unit 115. If the zoom mode is not instructed, the process ends. In this case, for example, images as shown in FIGS. 10A and 10B are displayed. In FIGS. 10A and 10B, a reference numeral 1001 indicates a reference point and a reference numeral 1002 indicates a zooming target frame. When the zoom mode is instructed, the process proceeds to step S902.

In step S902, the CPU 114 determines whether the reference point and the zooming target frame overlap each other. Here, the determination is made based on coordinates of display positions of the reference point and the zooming target frame in the live view image. If they do not overlap, the process ends, and if they do overlap, the process proceeds to step S903.

FIG. 10B shows a state immediately before it is determined that the reference point 1001 and the zooming target frame 1002 overlap each other when the digital camera 100 is panned to the right from the state shown in FIG. 10A.

Figure 10C:
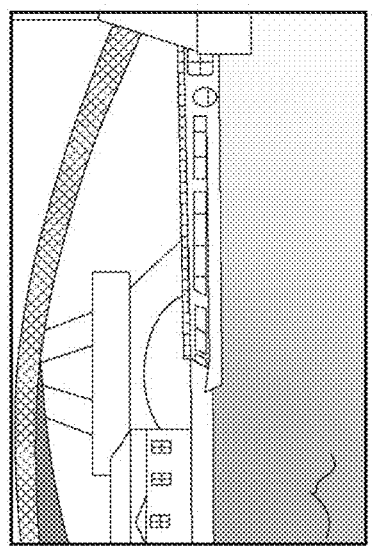

In step S903, the zoom magnification is increased by moving the position of the zoom lens included in the imaging optical unit 101 to the registered focal length based on the shooting information of the zooming target area corresponding to a zooming target frame 1002. FIG. 10C is a diagram showing an example of an image obtained by zooming in with a reference point 1001 in FIG. 10B as the center of zooming. In subsequent step S904, it is determined whether or not the zoom mode is ended. If it is not ended, the process returns to step S902, and if it is ended, the processing ends.

According to the fourth embodiment as described above, in addition to the same effects as in the first embodiment, it is possible to further shorten the time for changing the shooting composition.

Although the optical center position is displayed as the reference point in the examples shown in FIGS. 10A to 10C, the same effect can be obtained by displaying the AF frame as explained with reference to FIG. 5E. Further, in step S902, whether or not the reference point 1001 and the zooming target frame 1002 overlap each other is determined, however, whether or not the distance between the reference point 801 and the zooming target frame 802 is within a predetermined range may be determined instead.

Further, in the above example, explained it is that the focal length is changed in a case where the zoom mode is set by the operation unit 115. However, the control may be such that the focal length is always changed when the reference point 1001 and the zooming target frame 1002 overlap.

It should be noted that, for changing the focal length, an electronic zoom may be used instead of the optical zoom that drives the zoom lens.

Fifth Embodiment

Next, a fifth embodiment of the disclosure will be described. An image capturing apparatus according to the fifth embodiment is the same as that described with reference to FIG. 1, and thus the description thereof is omitted here. Further, in the fifth embodiment, processing of registering a zooming target area is the same as that described with reference to FIGS. 2A and 2B in the first embodiment or with reference to FIGS. 5A and 5B in the second embodiment, and the description thereof is omitted.

Angle of View Control

Next, angle of view control using the zooming target frame displayed in the live view image on the display unit 113 in the fifth embodiment will be described in detail with reference to FIG. 11 and FIGS. 12A to 12C.

In the fifth embodiment, it is assumed that the display processing of the zooming target frame described with reference to FIG. 2C in the first embodiment or the display processing of the zooming target frame and the reference point described with reference to FIGS. 5C to 5E in the second embodiment is repeatedly performed in a predetermined cycle, for example, every time a live view image is acquired. However, the processes of S533 to S535 are not performed in a case where the shooting conditions are not registered as described with reference to FIGS. 2A and 2B.

Figure 11:
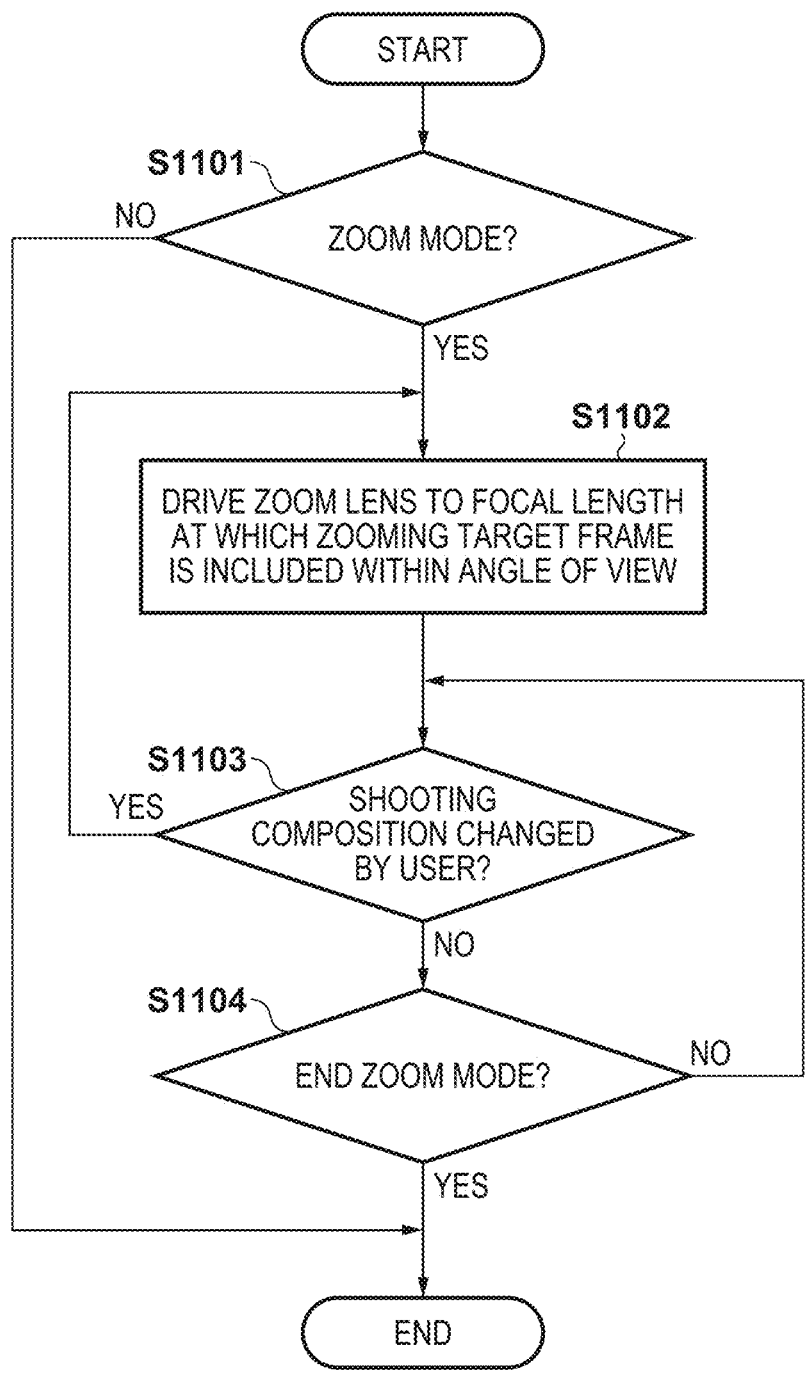
FIG. 11 is a flowchart showing angle-of-view control processing according to the fifth embodiment.

First, in step S1101 of FIG. 11, the CPU 114 determines whether or not a zoom mode is instructed by the operation of the operation unit 115. If the zoom mode is not instructed, the process ends. When the zoom mode is instructed, the process proceeds to step S1102.

In step S1102, the CPU 114 drives the zoom lens included in the imaging optical unit 101 to perform a zoom operation up to the focal length at which the zooming target frame 1202 is included within the angle of view of the live view image. In subsequent step S1103, it is determined whether or not the shooting composition is changed as the shooting direction of the digital camera 100 is changed by the user's operation. If changed, the process returns to step S1102 and the zoom operation is performed.

Figure 12A:
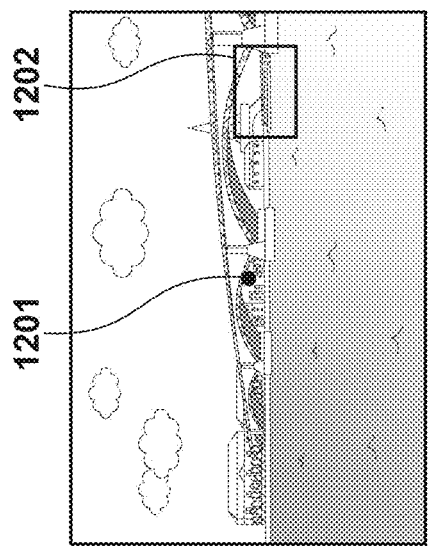
FIGS. 12A to 12C are schematic diagrams showing an example of displayed images according to the fifth embodiment.
Figure 12B:
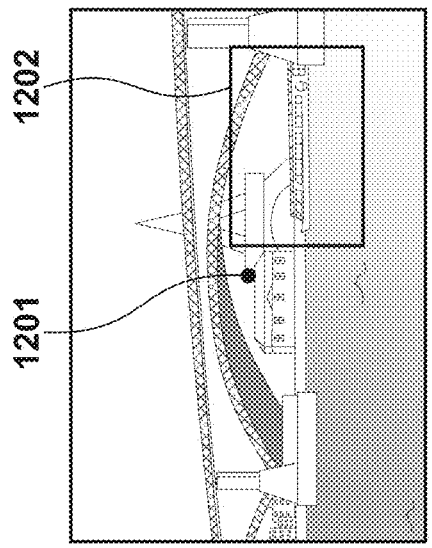
Figure 12C:
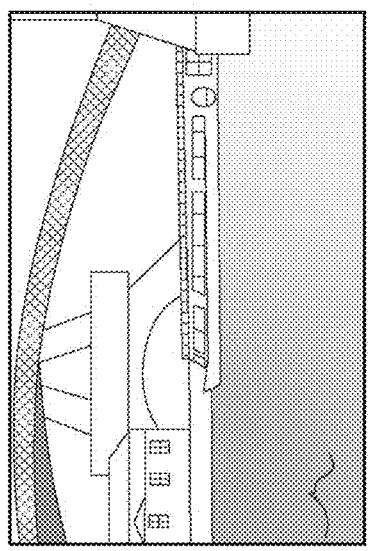

FIG. 12B is a schematic diagram which shows an image displayed when the digital camera 100 is panned to the right from the state shown in FIG. 12A so that the zooming target frame 1202 approaches the center of the screen (optical center 1201), and a zoom operation is implemented to a focal length at which the zooming target frame 1202 is included within the angle of view of the image sensor 102. In this way, as the zooming target frame 1202 approaches the optical center 1201, the zooming operation is performed stepwise to the focal length at which the zooming target frame 1202 is included within the angle of view of the image sensor 102. Then, when the angle of view of the zooming target frame 1202 and the angle of view of the image sensor 102 match, an image as shown in FIG. 12C is displayed.

On the other hand, in step S1103, when it is determined that the shooting composition is not changed, the process proceeds to step S1104. In step S1104, if the zoom mode is ended, the processing is ended, and if the zoom mode is not ended, the process proceeds to step S1103.

According to the fifth embodiment as described above, in addition to the same effects as those of the first embodiment, it is possible to further shorten the time for changing the shooting composition.

It should be noted that, as a zoom method, an electronic zoom may be used instead of the optical zoom that drives the zoom lens.

Sixth Embodiment

Next, a sixth embodiment of the disclosure will be described. An image capturing apparatus according to the sixth embodiment is the same as that described with reference to FIG. 1, and thus the description thereof is omitted here. Further, in the sixth embodiment, processing of registering a zooming target area is the same as that described with reference to FIGS. 2A and 2B in the first embodiment or with reference to FIGS. 5A and 5B in the second embodiment, and the description thereof is omitted.

Angle of View Control

Next, angle of view control using the zooming target frame displayed in the live view image on the display unit 113 in the sixth embodiment will be described in detail with reference to FIG. 13 and FIGS. 14A to 14D.

In the sixth embodiment, it is assumed that the display processing of the zooming target frame described with reference to FIG. 2C in the first embodiment or the display processing of the zooming target frame and the reference point described with reference to FIGS. 5C to 5E in the second embodiment is repeatedly performed in a predetermined cycle, for example, every time a live view image is acquired. However, the processes of S533 to S535 are not performed in a case where the shooting conditions are not registered as described with reference to FIGS. 2A and 2B.

Figure 13:
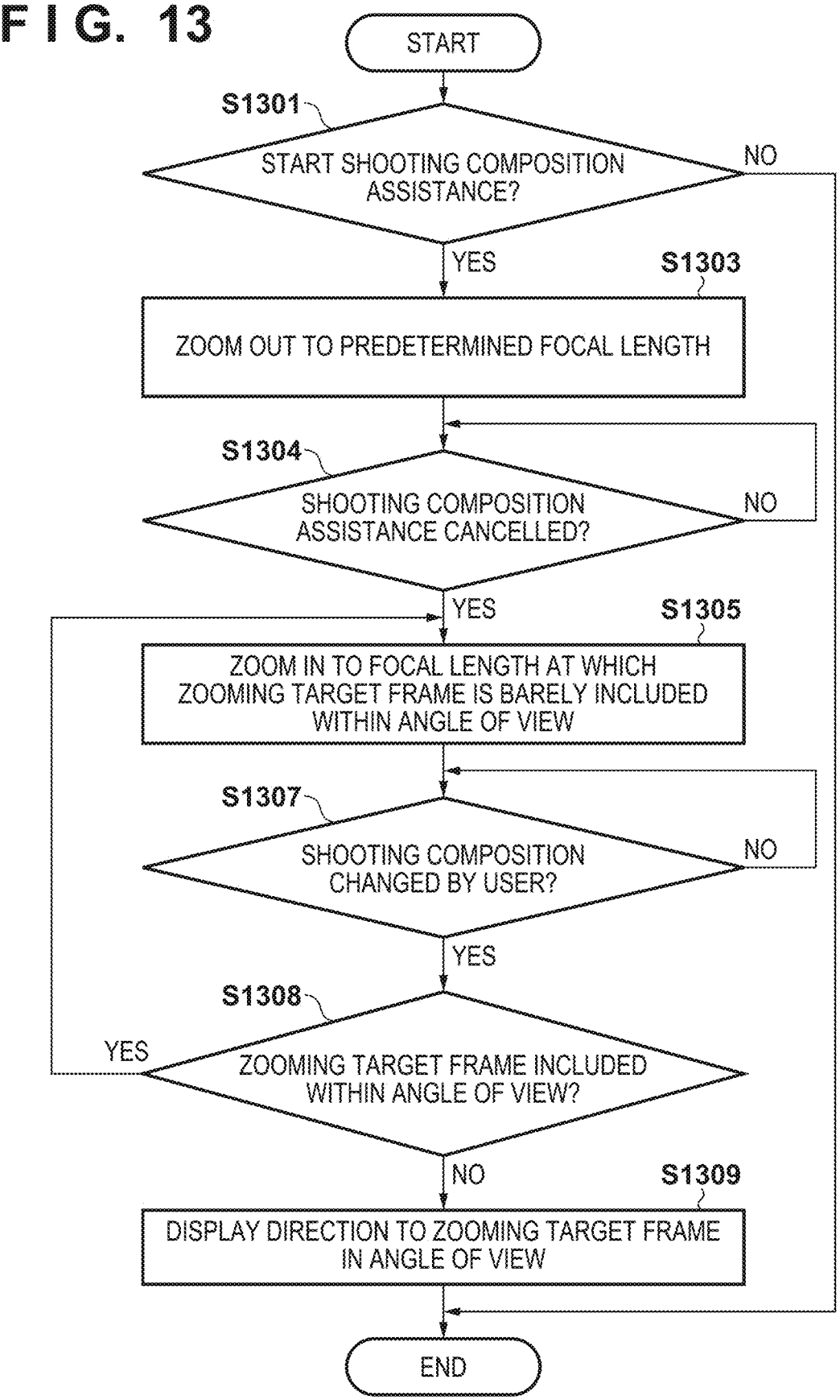
FIG. 13 is a flowchart showing angle-of-view control processing according to the sixth embodiment.

First, in step S1301 of FIG. 13, the CPU 114 determines whether or not shooting composition assistance is instructed by pressing the operation button of the operation unit 115. If the shooting composition assistance is not instructed, this process ends. When the shooting composition assistance is instructed, the process proceeds to step S1303. Note that in the sixth embodiment, the image displayed immediately before the shooting composition assistance is instructed in step S1302 is, for example, of a person 1402 shot with a telephoto angle of view by the digital camera 100 as shown in FIG. 14A. Further, the angle of view of the image shown in FIG. 14A is registered as a zooming target area.

When the shooting composition assistance is instructed, in step S1303, the zoom lens included in the imaging optical unit 101 is automatically driven up to a predetermined focal length on the wide angle side to perform a zoom-out operation. FIG. 14B illustrates an example of an image displayed when the shooting composition assistance is performed, where the angle of view becomes wide after zooming out, and the shooting direction of the digital camera 100 is panned to the right. In FIG. 14B, the dotted line frame 1412 which indicates the angle of view at the focal length before starting the shooting composition assistance is shown as a guide at the optical center position. A zooming target frame 1411 corresponding to the zooming target area shown in FIG. 14A is also displayed.

Next, in step S1304, it is determined whether the shooting composition assistance is canceled by releasing the operation button of the operation unit 115. If it is released, the process proceeds to step S1305, and if not released, the process of step S1303 is repeated.

In step S1305, the zoom-in operation is performed by automatically driving the zoom lens included in the imaging optical unit 101 up to the focal length at which the zooming target frame 1411 is barely included within the angle of view. FIG. 14C shows an example of an image displayed in a case where the zoom-in operation is performed up to the focal length at which the zooming target frame 1411 is barely included within the angle of view after the shooting composition assistance is released from the state shown in FIG. 14B.

In the next step S1307, it is determined whether the shooting composition is changed by changing the shooting direction of the digital camera 100. If changed, the process proceeds to step S1308, and if not changed, the process of step S1307 is repeated.

In step S1308, it is determined whether the zooming target frame 1411 is within the angle of view, and if it is within the angle of view, the process proceeds to step S1305. On the other hand, if it is determined that the zooming target area is not within the angle of view, the process proceeds to step S1309, and the direction to the zooming target area is displayed within the angle of view. FIG. 14D is a diagram showing an example of an image when a person 1404 is captured by telephoto shooting and displayed as a live-view image on the display unit 113, and an icon 1420 indicating the direction to the zooming target frame 1411 outside the angle of view is displayed. Note that She process of displaying the icon 1420 indicating the direction to the zooming target frame 1411 in step S1309 may not be performed.

When the process of step S1309 ends, this processing ends.

According to the sixth embodiment as described above, in addition to the same effects as those of the first embodiment, when the subject is lost during telephoto shooting, for example, it becomes easier to recapture the subject within the angle of view by changing the focal length toward the wide-angle side.

In the present embodiment, an example in which the number of zooming target area is one has been described, but the aspect of the embodiment may be applied to the case where there are a plurality of zooming target areas. In that case, for example, in step S1305, the zooming operation may be performed so that all zooming target frames are included within the angle of view, or the zooming target frame of a specific zooming target area, such as the zooming target area which is captured most recently, is included within the angle of view. Then, in step S1309, an icon/icons indicating the direction/directions to all zooming target area/areas outside the angle of view may be displayed, or an icon indicating the direction to the specific zooming target area, such as the zooming target area captured most recently, outside the angle of view may be displayed.

Seventh Embodiment

Next, a seventh embodiment of the disclosure will be described. An image capturing apparatus according to the seventh embodiment is the same as that described with reference to FIG. 1, and thus the description thereof is omitted here. Further, in the seventh embodiment, processing of registering a zooming target area is the same as that described with reference to FIGS. 2A and 2B in the first embodiment or with reference to FIGS. 5A and 5B in the second embodiment, and the description thereof is omitted.

Method of Displaying Zooming Target Frames

Next, display processing using a zooming target frame in the seventh embodiment will be described in detail with reference to FIG. 15 and FIGS. 16A to 16C.

Figure 16A:
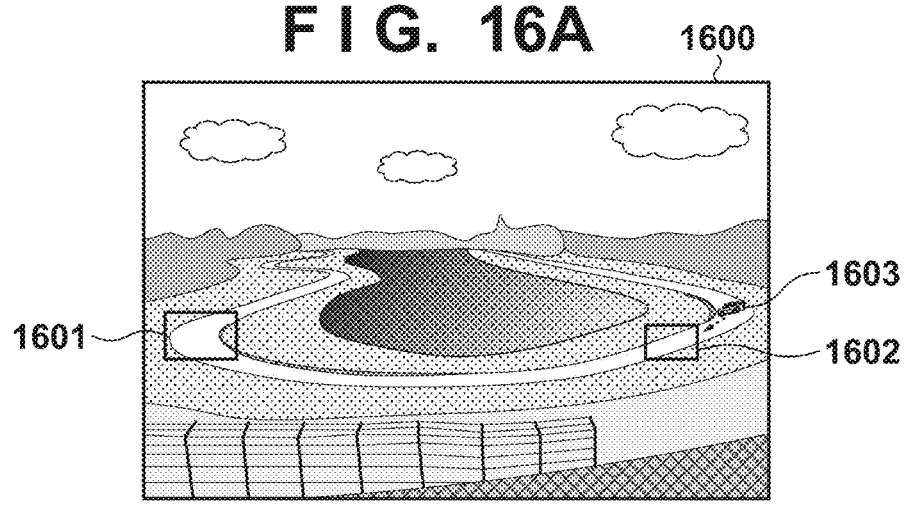
FIGS. 16A to 16C are schematic diagrams showing a display processing of an image capturing apparatus according to the seventh embodiment.

In the seventh embodiment, it is assumed that the display processing of the zooming target frame described with reference to FIG. 2C in the first embodiment is repeatedly performed in a predetermined cycle, for example, every time a live view image is acquired. FIG. 16A shows a live view image 1600 that is basically displayed on the display unit 113 as a result of the display processing of FIG. 2C, and zooming target frames 1601 and 1602 are superimposed on the live view image 1600.

In step S1501 of FIG. 15, the image processing unit 104 detects a moving object within the angle of view of the image sensor 102. Specifically, an area of the moving object is detected by calculating the difference between pixel values of each pixel in different frames of the live view image obtained at regular intervals and detecting an area, other than the background area, where an amount of change of the differences is large. Before calculating the difference between pixel values of each pixel in different frames, the alignment process between frames may be performed to correct the amount of camera shake based on camera shake information from a gyro sensor (not shown) included in the digital camera 100. In the example shown in FIG. 16A, a moving body 1603 is detected. If no moving body is detected, step S1501 is repeated, and if detected, the process proceeds to step S1502.

In step S1502, the coordinates of the area of the moving body 1603 are calculated. Here, for example, the coordinates of the center of the area of the moving body 1603 are calculated. In the next step S1503, the distances between the calculated area of the moving body 1603 and the zooming target frames 1601 and 1602 are calculated. It is determined whether or not the calculated distance is shorter than a predetermined value (that is, whether the moving body 1603 is close to the zooming target frame 1601 or 1602), and if it is short (close), the process proceeds to step S1504, and if it is not short (not close), the process ends.

Figure 16B:
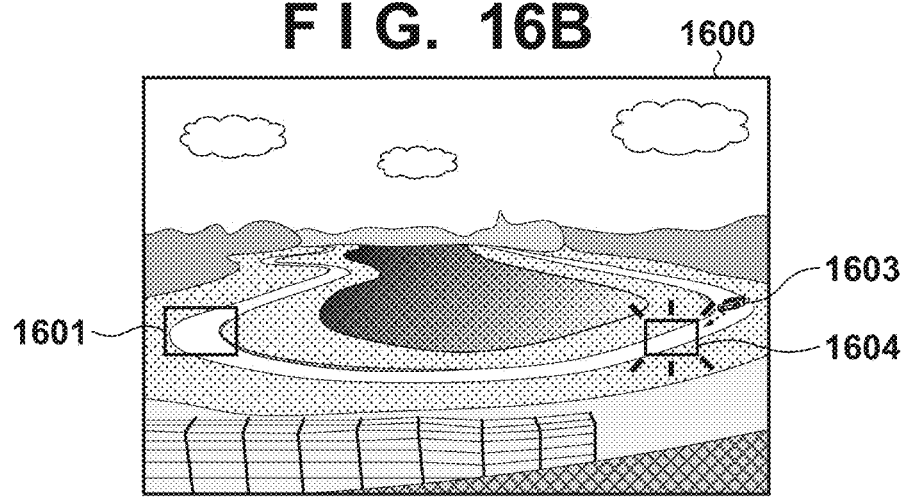
Figure 16C:
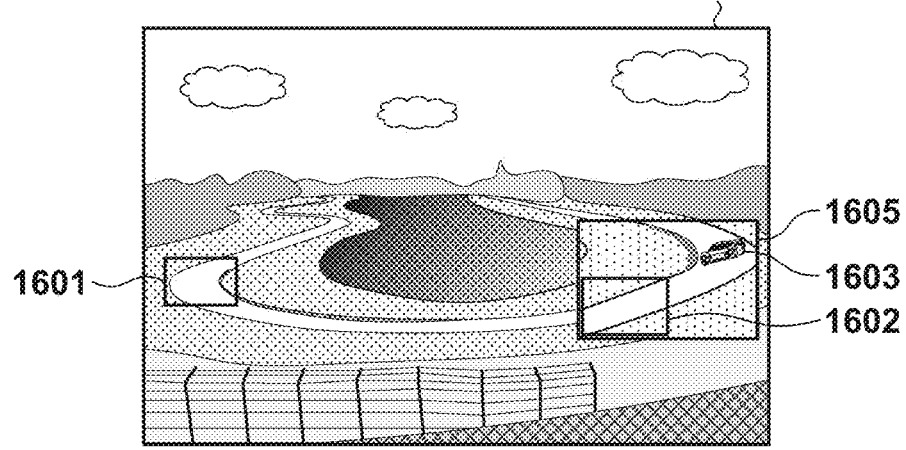

In step S1504, the zooming target frame 1602 that is determined to be close to the moving body 1603 is highlighted. Examples of the highlighted display include a method of blinking the zooming target frame 1604 as shown in FIG. 16B, and an enlarged display of an area 1605 including the zooming target frame 1602 and the moving body 1603 as shown in FIG. 16C. In addition, various methods such as displaying an icon on the display unit 113 to notify, or notifying with sound from a speaker included in the digital camera 100 are possible, and the aspect of the embodiments is not limited by the highlighting method.

When the highlighting ends, the process ends.

According to the seventh embodiment as described above, in addition to the same effects as in the first embodiment, it is possible to reduce the loss of the shooting opportunity of the moving body.

Eighth Embodiment

Next, an eighth embodiment of the disclosure will be described.

Configuration of Image Capturing Apparatus

Figure 17:
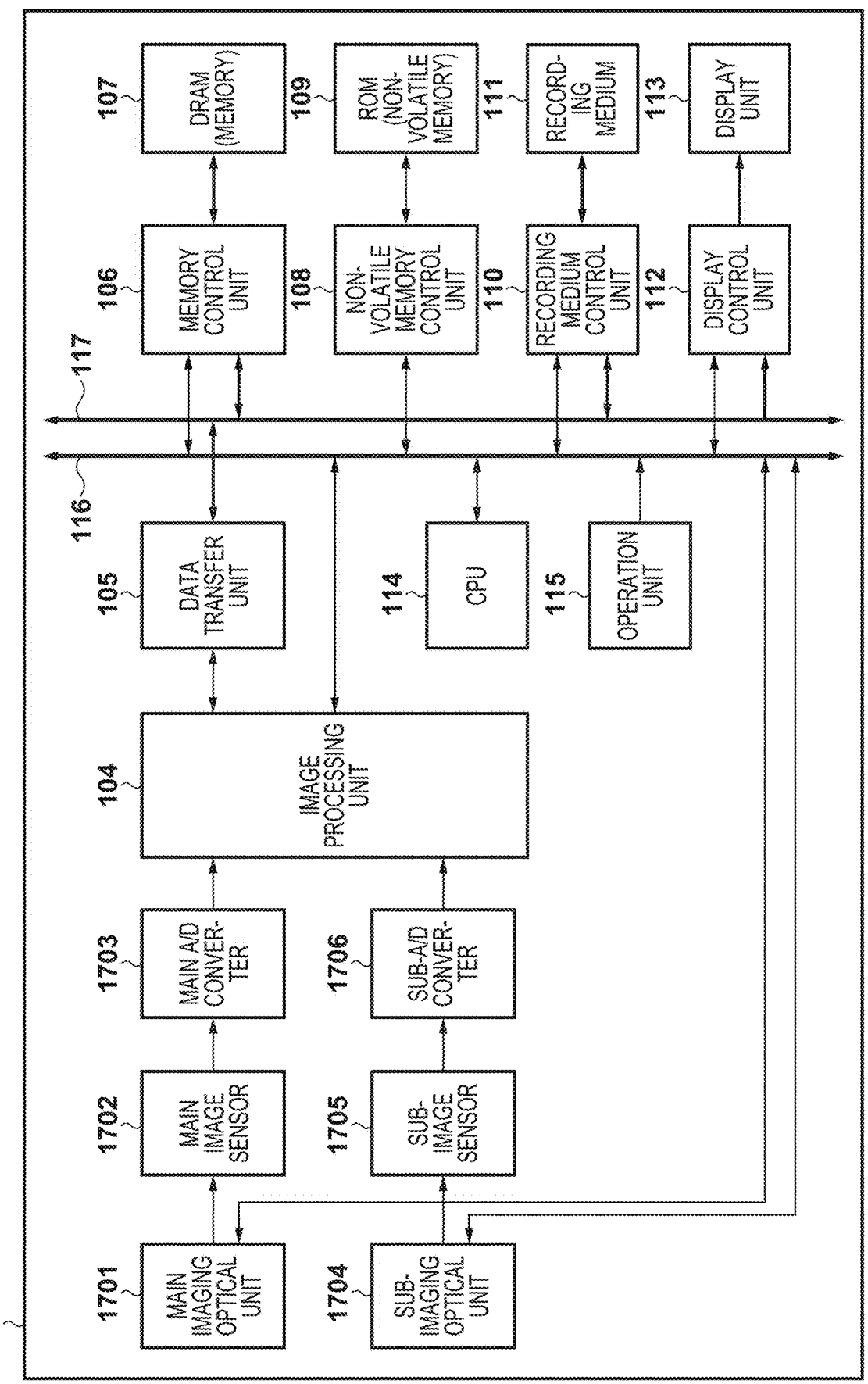
FIG. 17 is a block diagram showing a configuration of a digital camera according to eight to twelfth embodiments of the disclosure.

FIG. 17 is a block diagram showing the configuration of a digital camera 1700 which is an image capturing apparatus according to the eighth embodiment of the disclosure. In FIG. 17, the same components as those shown in FIG. 1 are designated by the same reference numerals and the description thereof will be omitted. The digital camera 1700 is different from the digital camera 100 shown in FIG. 1 in that a sub-imaging system for capturing a wide-angle image for assisting shooting composition is provided in addition to a main imaging system for recording.

In FIG. 17, a main imaging optical unit 1701 that mainly performs telephoto shooting includes a diaphragm and a lens group including a plurality of lenses including a zoom lens, a focus lens, and an image stabilization lens. At the time of shooting, the main imaging optical unit 1701 changes the focal length, performs focus adjustment, exposure adjustment, image stabilization, and the like, and forms an optical image on a main image sensor 1702. The main image sensor 1702 has a photoelectric conversion function of converting an optical image into an electric signal (analog image signal), and is composed of a CCD, a CMOS sensor, or the like. A main A/D converter 1703 converts the analog image signal from the main image sensor 1702 into a digital image signal. The converted image data is input to the image processing unit 104 provided downstream of the main A/D converter 1703.

Further, the sub-imaging system for the purpose of performing wide-angle shooting includes a sub-imaging optical unit 1704, a sub-image sensor 1705, and a sub-A/D converter 1706 that have the same functions as corresponding configuration of the main imaging system. The converted image data is input to the image processing unit 104 provided downstream of the sub-A/D converter 1706.

Next, the zooming target area display processing in the eighth embodiment in the digital camera 1700 having the above configuration will be described in detail.

Method of Setting the Zooming Target Area

In the eighth embodiment, processing of registering a zooming target area is the same as that described with reference to FIGS. 2A and 2B in the first embodiment or with reference to FIGS. 5A and 5B in the second embodiment, and the description thereof is omitted. However, the image registered as the zooming target area is an image captured by the main image sensor 1702.

Displaying Zooming Target Frames and Main Shooting Frame

Figure 18A:
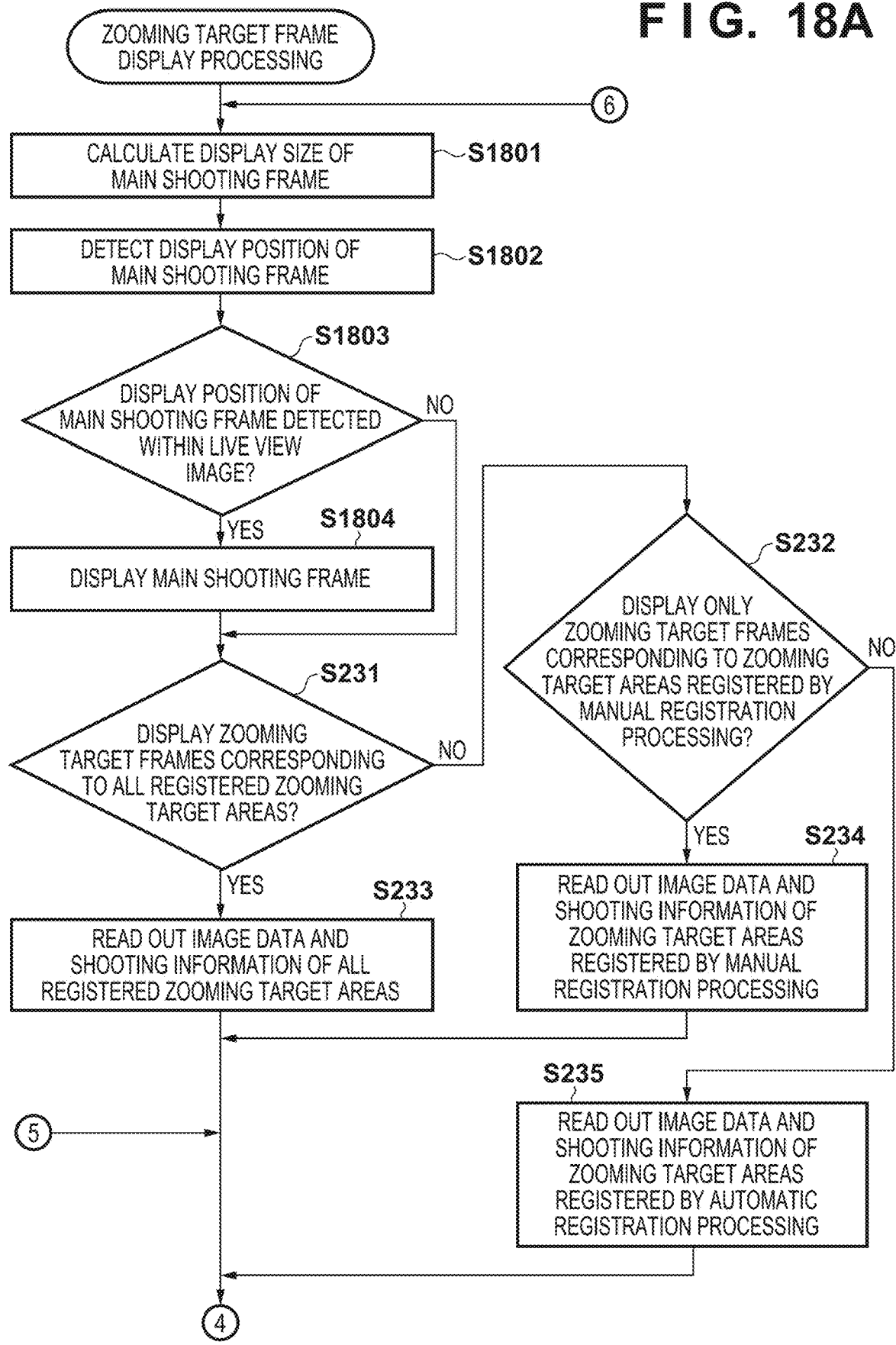
FIGS. 18A and 18B are flowcharts showing display processing of a zoom target frame according to the eighth embodiment.
Figure 18B:
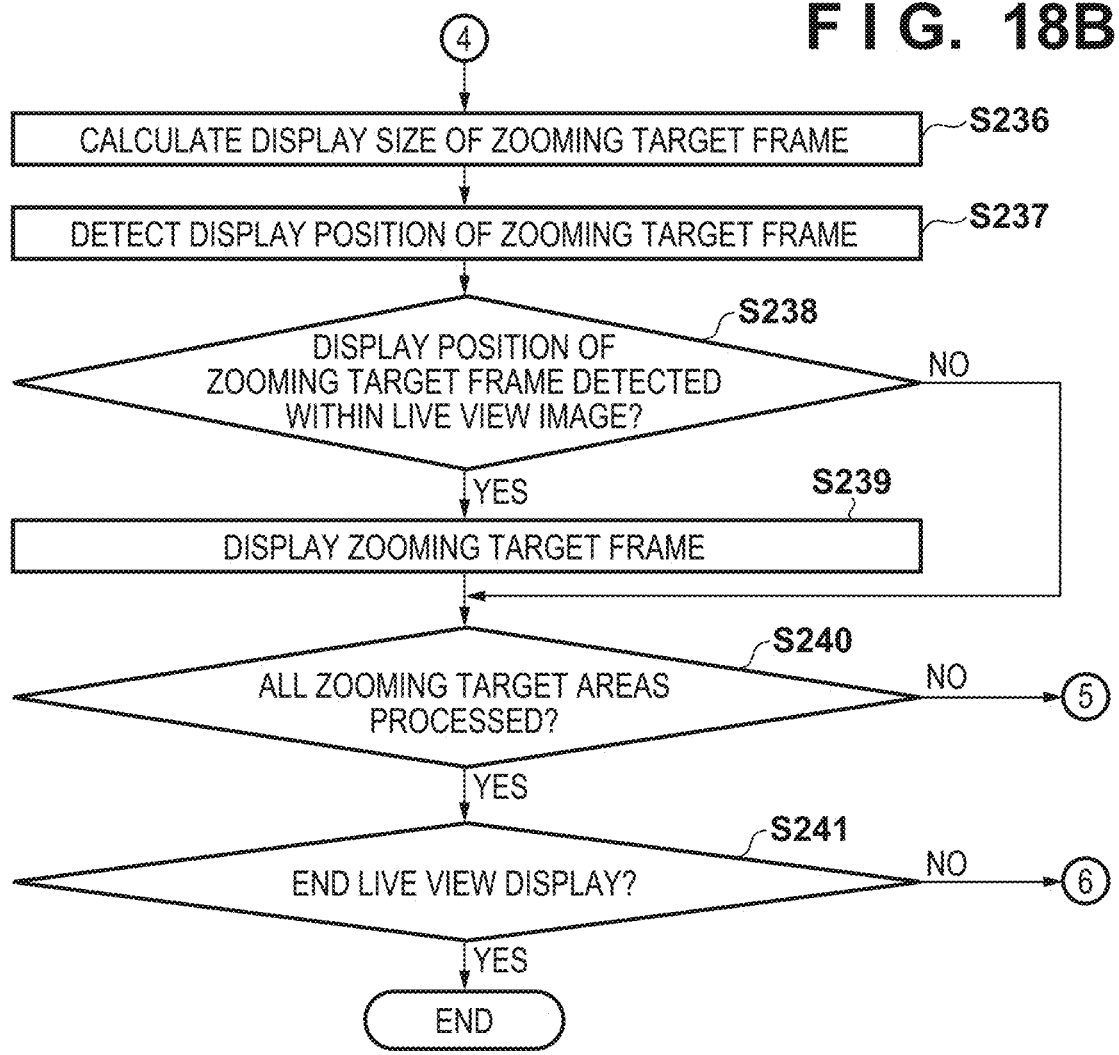

Next, the display processing of superimposing and displaying the zooming target area and the main shooting frame corresponding to the current shooting area of the main image sensor 1702 in the present embodiment at the corresponding positions in the live view image displayed on the display unit 113, will be described in detail with reference to FIGS. 18A and 18B. In addition, in the present embodiment, an image periodically captured by the sub-image sensor 1705 is displayed on the display unit 113 as a live view image. In FIGS. 18 and 18B, the same processes as those in FIG. 2C are denoted by the same reference numerals, and description thereof will be omitted.

When the processing is started, in step S1801, the CPU 114 calculates, based on the current focal length information of the main image sensor 1702 and the current focal length information of the sub-image sensor 1705 capturing the live view image, the display size of the main shooting frame.

Next, in step S1802, the image processing unit 104 detects the display position of the main shooting frame based on the image data obtained by the main image sensor 1702 and the live view image data obtained by the sub-image sensor 1705. Examples of methods for detecting the display position of the main photographing frame includes a method of performing template matching processing of image data.

In the next step S1803, the CPU 114 determines whether or not the display position of the main shooting frame is detected in the live view image. Since the detection result output from the image processing unit 104 in the processing of step S1802 is based on the highest correlation value by the template matching processing, it is output even if the display position does not actually exist in the live view image. Therefore, for example, the CPU 114 performs threshold processing or the like on the correlation value output from the image processing unit 104 in the processing of step S1802, and in a case where the result indicates highly reliable, the CPU 114 determines that the display position of the main shooting frame is detected in the live view image. If the display position of the main shooting frame is detected in the live view image, the process proceeds to step S1804, and if not detected, the process proceeds to step S231.

In step S1804, the CPU 114 issues an instruction to the display control unit 112 to superimpose the main shooting frame that can be displayed in the live view image, which is determined in step S1803, on the live view image and displays it on the display unit 113, and the process proceeds to step S231. The processes after S213 is the same as those shown in FIG. 2C.

Figure 19:
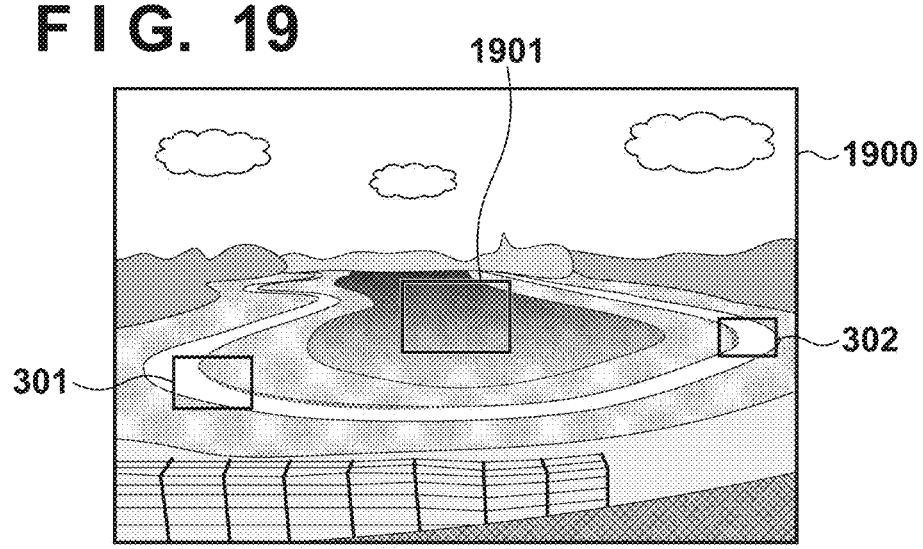
FIG. 19 is a schematic diagram showing an example of a displayed image according to the eighth embodiment.

FIG. 19 is a diagram showing an example of an image displayed on the display unit 113 in the present embodiment. As in the first embodiment, the zooming target frames 301 and 302 corresponding to the zooming target areas registered by the manual registration processing and the automatic registration processing are superimposed on a live view image 1900 captured by the sub-image sensor 1705. In addition to this, in the present embodiment, a main shooting frame 1901 corresponding to the current shooting area of the main image sensor 1702 is superimposed on the live view image 1900 so that the shooting composition of the main image sensor 1702 can be changed more smoothly by referring to the displayed zooming target frames 301 and 302.

As described above, by displaying the registered zooming target frame at the corresponding position in the live-view image on the display device captured by the sub-image sensor 1705 such as the electronic viewfinder, it can be used as an index when searching for a telephoto shooting composition in the wide-angle image. In addition, by using the main camera and sub camera, the user can easily and quickly check a wide-angle live view image captured by the sub camera and a zooming target frame without changing the zoom magnification of the main camera for telephoto shooting. This shortens the time required to search for a shooting composition during telephoto shooting, enables smooth composition changes, and reduces loss of shooting opportunities.

Ninth Embodiment

Next, a ninth embodiment of the disclosure will be described. An image capturing apparatus according to the ninth embodiment is the same as that described with reference to FIG. 17, and thus the description thereof is omitted here. Further, in the ninth embodiment, processing of registering a zooming target area is the same as that described with reference to FIGS. 2A and 2B in the first embodiment or with reference to FIGS. 5A and 5B in the second embodiment, and the description thereof is omitted. However, the image registered as the zooming target area is an image captured by the main image sensor 1702.

Method of Displaying Zooming Target Frames

Next, with reference to FIGS. 20 and 21A to 21C, a display process for superimposing and displaying a zooming target frame at a corresponding position in the live view image displayed on the display unit 113 in the ninth embodiment will be described in detail.

In the ninth embodiment, it is assumed that the display processing of the zooming target frame and the main shooting frame described with reference to FIGS. 18A and 18B in the eighth embodiment is repeatedly performed in a predetermined cycle, for example, every time a live view image is acquired.

Figure 20:
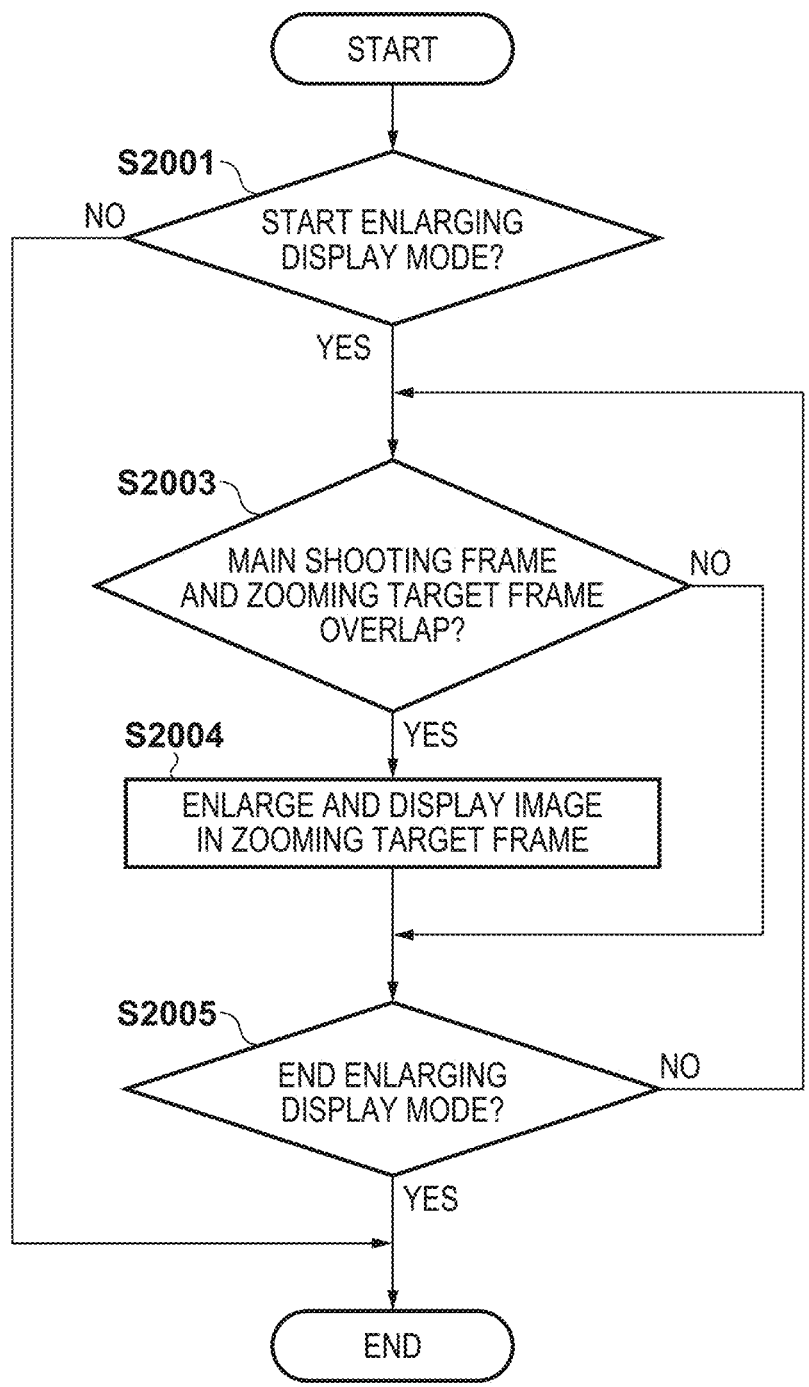
FIG. 20 is a flowchart showing display control processing using a zooming target frame according to the ninth embodiment.
Figure 21C:
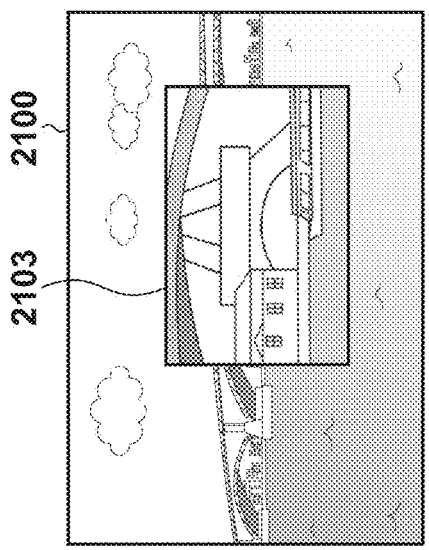
FIGS. 21A to 21C are schematic diagrams showing an example of displayed images according to the ninth embodiment.
Figure 21B:
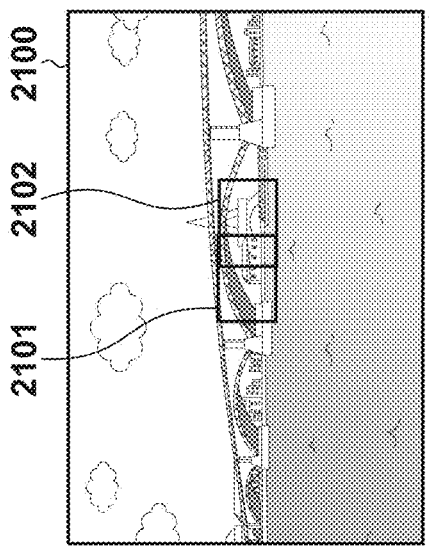
Figure 21A:
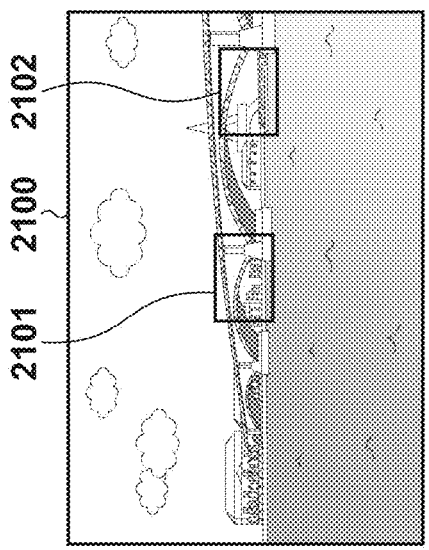

First, in step S2001 of FIG. 20, the CPU 114 determines whether or not an enlarging display mode of the zooming target area is instructed by the operation of the operation unit 115. If the enlarging display mode is not instructed, the process ends. In this case, for example, as shown in FIGS. 21A and 21B, a main shooting frame 2101 and a zooming target frame 2102 are displayed on a live view image 2100 shot by the sub-image sensor 1705. When the enlarging display mode is instructed, the process proceeds to step S2003.

In step S2003, it is determined whether the main shooting frame 2101 and the zooming target frame 2102 overlap. The overlap determination between the main shooting frame 2101 and the zooming target frame 2102 is performed by calculating coordinates of their display positions in the live view image 2100. For example, if the distance between the center position of the main shooting frame 2101 and the center position of the zooming target frame 2102 is shorter than a predetermined distance, then, it is determined that they overlap. Alternatively, the determination may be made based on the ratio of the area of the overlapping region to the area of the main shooting frame 2101 and the zooming target frame 2102, thus, the determination method is not limited. If it is determined that the main shooting frame 2101 and the zooming target frame 2102 overlap, the process proceeds to step S2004.

FIG. 21B shows a state immediately before it is determined that the main shooting frame 2101 and the zooming target frame 2102 overlap each other in step S2003 when the digital camera 1700 is panned to the right from the state shown in FIG. 21A, and the main shooting frame 2101 and the zooming target frame 2102 have come close.

In step S2004, the image in the zooming target frame 2102 is enlarged and displayed. FIG. 21C shows an example in which the image in the zooming target frame 2102 is enlarged and displayed. If the zooming target frame 2102 is within the main shooting frame 2101 shot by the main image sensor 1702 during the enlarging display, the image in the zooming target frame 2102 inside the main shooting frame 2101 is displayed in an enlarged display window 2103. If not within the main shooting frame 2101, the image in the zooming target frame 2102 in the live view image 2100 captured by the sub-image sensor 1705 is enlarged by the image processing unit 104 and displayed in the enlarged display window 2103.

On the other hand, if it is determined in step S2003 that they do not overlap, the process proceeds to step S2006 without performing enlarged display of the image in the zooming target frame 2102.

In step S2006, it is determined whether the enlarging display mode has ended. If the user has operated the operation unit 115 to end the enlarging display mode, the process ends. If the enlarging display mode has not ended, the process returns to step S2003.

According to the ninth embodiment as described above, by enlarging the image in the zooming target frame in the live view image, it is possible to easily confirm the image obtained in the enlarged display area.

In the example described above, the image in the zooming target frame is enlarged and displayed when the enlarging display mode is set from the operation unit 115, but the control may be performed such that the image in the zooming target frame is always enlarged and displayed in a case where the distance between the main shooting frame 2101 and the zooming target frame 2102 is within a predetermined range.

Further, as the enlarged display, the image may be displayed on the entire screen instead of the partial screen as shown in FIG. 21C. If the image processing in the special processing mode is set in the shooting condition of the zooming target frame 2102 during the enlarged display, the specially processed image may be enlarged and displayed. For example, when the monochrome shooting mode is set as the shooting condition as the special processing mode, the image in the zooming target frame 2102 that undergoes the monochrome image processing is enlarged and displayed.

Furthermore, when performing enlarged display, the method of reading out an image from the sub-image sensor 1705 may be changed so that the resolution is increased. For example, before enlarging display, adjacent pixel values are added in sub-image sensor 1705 and then read out, and during enlarging display, the readout method may be changed so that each pixel value of the image in zooming target frame 2102 is read out independently without being added.

Tenth Embodiment

Next, a tenth embodiment of the disclosure will be described. An image capturing apparatus according to the tenth embodiment is the same as that described with reference to FIG. 17, and thus the description thereof is omitted here. Further, in the tenth embodiment, processing of registering a zooming target area is the same as that described with reference to FIGS. 2A and 2B in the first embodiment or with reference to FIGS. 5A and 5B in the second embodiment, and the description thereof is omitted. However, the image registered as the zooming target area is an image captured by the main image sensor 1702.

Angle of View Control

Next, angle of view control using the zooming target frame displayed in the live view image on the display unit 113 in the tenth embodiment will be described in detail with reference to FIG. 22 and FIGS. 23A to 23C.

In the tenth embodiment, it is assumed that the display processing of the zooming target frame and the main shooting frame described with reference to FIGS. 18A and 18B in the eighth embodiment is repeatedly performed in a predetermined cycle, for example, every time a live view image is acquired.

Figure 22:
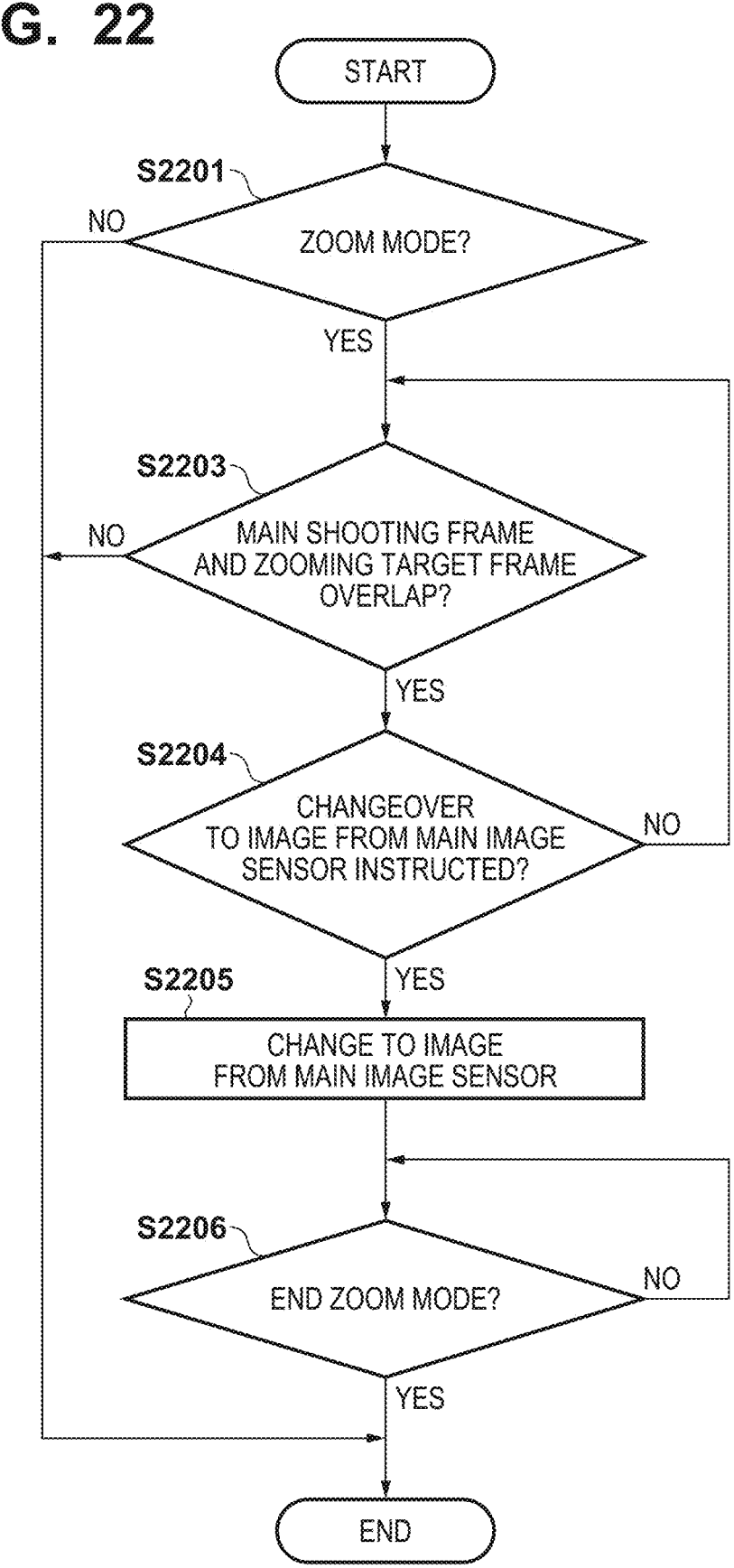
FIG. 22 is a flowchart showing angle-of-view control processing according to the tenth embodiment.

First, in step S2201 of FIG. 22, the CPU 114 determines whether or not a zoom mode is instructed by the operation of the operation unit 115. If the zoom mode is not instructed, the process ends. In this case, for example, an image as shown in FIG. 23A or 23B is displayed. In FIGS. 23A and 23B, reference numeral 2300 indicates a live view image displayed on the display unit 113; 2301, a main shooting frame; and 2302, a zooming target frame. When the zoom mode is instructed, the process proceeds to step S2203.

In step S2203, it is determined whether the main shooting frame and the zooming target frame overlap. The overlap determination between the main shooting frame and the zooming target frame is performed by calculating coordinates of their display positions in the live view image. As the determination method here, for example, the same method as used in step S2003 in FIG. 20 may be used. If the main shooting frame and the zooming target frame do not overlap, the process ends, and if they do not overlap, the process proceeds to step S2204.

FIG. 22B shows a state immediately before it is determined that the main shooting frame 2301 and the zooming target frame 2302 overlap each other when the digital camera 1700 is panned to the right from the state shown in FIG. 23A.

In step S2204, the CPU 114 determines whether switching is instructed by a user operating a UI button or the like for switching between an image captured by the main image sensor 1702 of the operation unit 115 and a live view image captured by the sub-image sensor 1705. If instructed, the process proceeds to step S2205, and if not instructed, the process returns to step S2203.

Figure 23C:
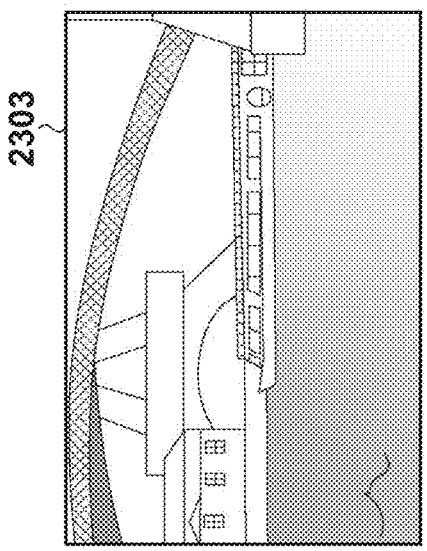
FIGS. 23A to 23C are schematic diagrams showing an example of displayed images according to the tenth embodiment.
Figure 23B:
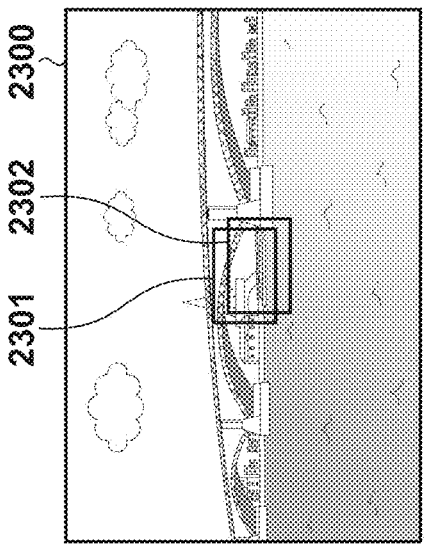
Figure 23A:
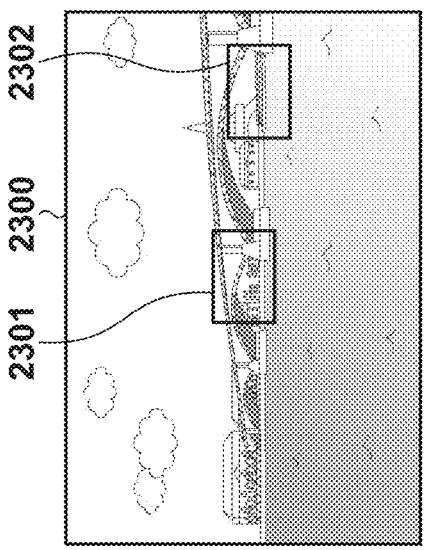

In step S2205, as shown in FIG. 23C, the image displayed on the display unit 113 is switched from the live view image 2300 captured by the sub-image sensor 1705 to the image 2303 captured by the main image sensor 1702. Note that the display processing described with reference to FIGS. 18A and 18B is stopped in response to this switching. In subsequent step S2206, if the zoom mode ends, the processing ends.

As described above, according to the tenth embodiment, in addition to the same effects as those in the eighth embodiment, the photographing composition can be easily switched.

Further, in the above-mentioned example, when the zoom mode is set by the operation unit 115 and the switching instruction is issued, switching to the main image sensor 1702 is performed. Alternatively, the control may be performed so as to always switch to the main image sensor when the main shooting frame 2301 and the zooming target frame 2302 overlap.

Eleventh Embodiment

Next, an eleventh embodiment of the disclosure will be described. An image capturing apparatus according to the eleventh embodiment is the same as that described with reference to FIG. 17, and thus the description thereof is omitted here. Further, in the eleventh embodiment, processing of registering a zooming target area is the same as that described with reference to FIGS. 2A and 2B in the first embodiment or with reference to FIGS. 5A and 5B in the second embodiment, and the description thereof is omitted. However, the image registered as the zooming target area is an image captured by the main image sensor 1702.

Angle of View Control

Next, angle of view control using the zooming target frame displayed in the live view image on the display unit 113 in the eleventh embodiment will be described in detail with reference to FIG. 24 and FIGS. 25A to 25C.

In the eleventh embodiment, it is assumed that the display processing of the zooming target frame and the main shooting frame described with reference to FIGS. 18A and 18B in the eighth embodiment is repeatedly performed in a predetermined cycle, for example, every time a live view image is acquired.

Figure 24:
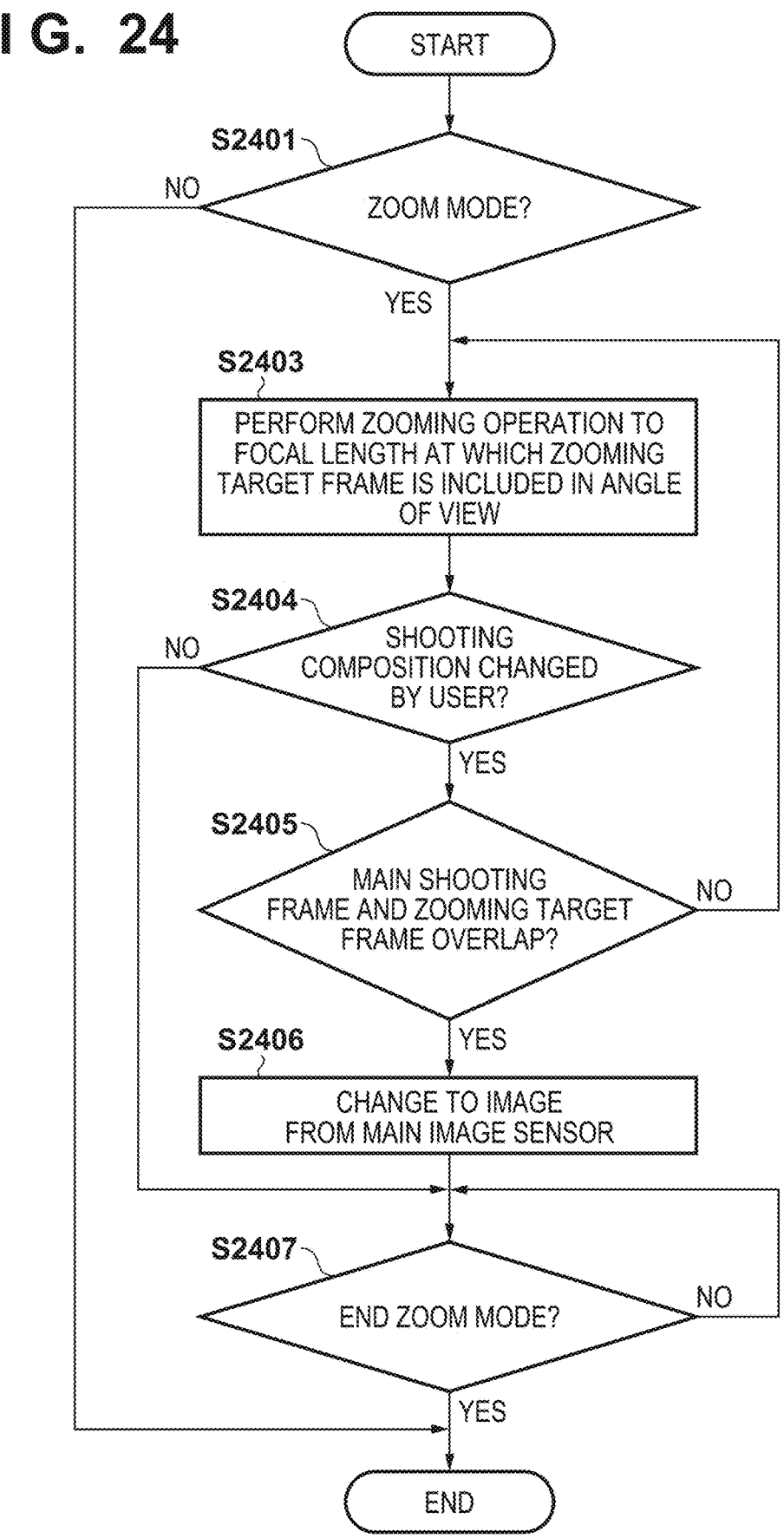
FIG. 24 is a flowchart showing angle-of-view control processing according to the eleventh embodiment.

First, in step S2401 of FIG. 24, the CPU 114 determines whether or not a zoom mode is instructed by the operation of the operation unit 115. If the zoom mode is not instructed, the process ends. When the zoom mode is instructed, the process proceeds to step S2403.

In step S2403, the CPU 114 performs a zoom operation up to the focal length in which the zooming target frame 2502 is included within the angle of view of the live view image. Here, as a zoom display method, the image processing unit 104 performs electronic zoom for enlarging and zooming an image captured by the sub-image sensor 1705. In subsequent S2404, it is determined whether or not the shooting composition is changed as the shooting direction of the digital camera 1700 is changed by the user's operation. If the shooting composition is changed, the process proceeds to step S2405, whereas if not changed, the process proceeds to step S2407.

Figure 25:
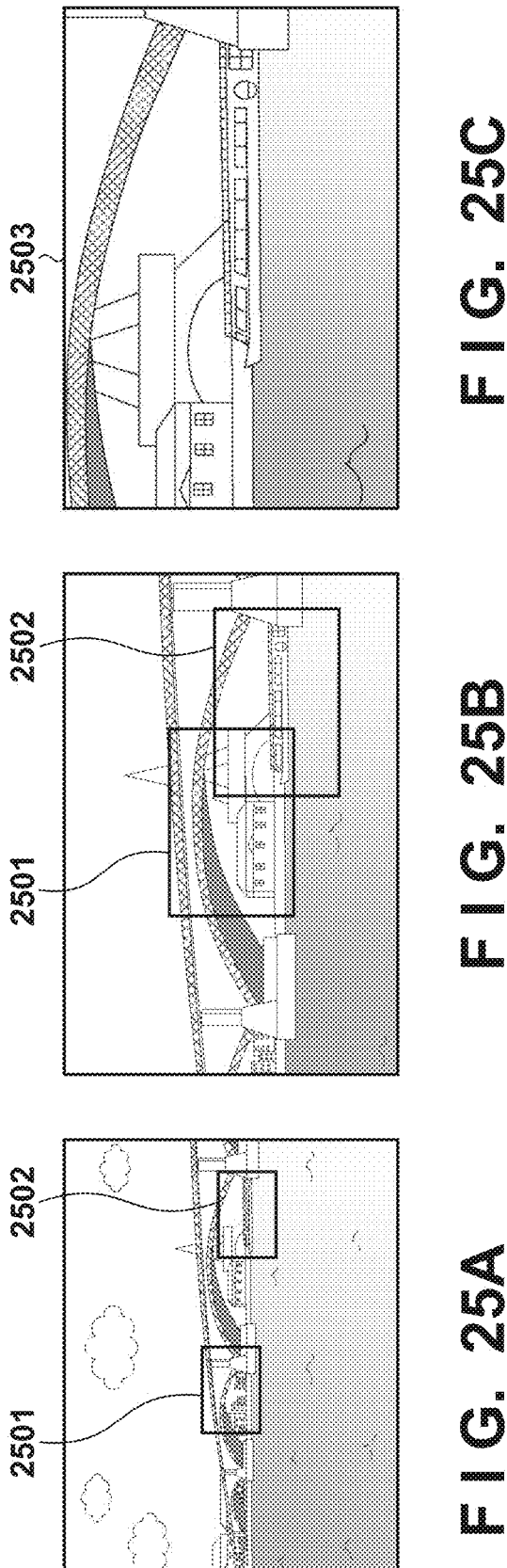
FIGS. 25A to 25C are schematic diagrams showing an example of displayed images according to the eleventh embodiment.

FIG. 25B is a schematic diagram which shows an image displayed when the digital camera 1700 is panned to the right from the state shown in FIG. 25A so that the main shooting frame 2501 and the zooming target frame 2502 approach each other, and a zoom operation is implemented to a focal length at which the zooming target frame 2502 is included within the angle of view of the live view image displayed on the display unit 113. In this way, as the main shooting frame 2501 and the zooming target frame 1202 approach each other, the zooming operation is performed stepwise to the focal length at which the zooming target frame 2502 is included within the angle of view of the live view image.

In step S2405, it is determined whether the main shooting frame 2501 and the zooming target frame 2502 overlap. In addition, as the determination method here, for example, the same method as step S2003 in FIG. 20 can be used. If it is determined that they do not overlap, the process returns to step S2403. If it is determined that they overlap, the process proceeds to step S2406.

FIG. 25C shows a schematic diagram which shows a display process when the main shooting frame 2501 and the zooming target frame 2502 approach each other as shown in FIG. 25B, and a zooming operation is performed up to the focal length at which the zooming target frame 2502 is eventually included in the live view image 2500. As the main shooting frame 2501 and the zooming target frame 2502 approach each other, the zooming operation is performed stepwise to the focal length at which the zooming target frame 2502 is included within the angle of view of the image capturing apparatus.

In step S2406, the live view screen display is switched from the image captured by the sub-image sensor 1705 to the image 2503 captured by the main image sensor 1702 as shown in FIG. 25C. Note that the display processing described with reference to FIGS. 18A and 18B is stopped in response to this switching. In subsequent step S2407, if the zoom mode ends, the processing ends.

As described above, according to the eleventh embodiment, in addition to the same effects as those in the eighth embodiment, the photographing composition can be easily switched.

Twelfth Embodiment

Next, a twelfth embodiment of the disclosure will be described. An image capturing apparatus according to the twelfth embodiment is the same as that described with reference to FIG. 17, and thus the description thereof is omitted here. Further, in the twelfth embodiment, processing of registering a zooming target area is the same as that described with reference to FIGS. 2A and 2B in the first embodiment or with reference to FIGS. 5A and 5B in the second embodiment, and the description thereof is omitted. However, the image registered as the zooming target area is an image captured by the main image sensor 1702.

Method of Displaying Zooming Target Frames

Next, display processing using a zooming target frame in the twelfth embodiment will be described in detail with reference to FIG. 26 and FIGS. 27A to 27C.

Figure 27A:
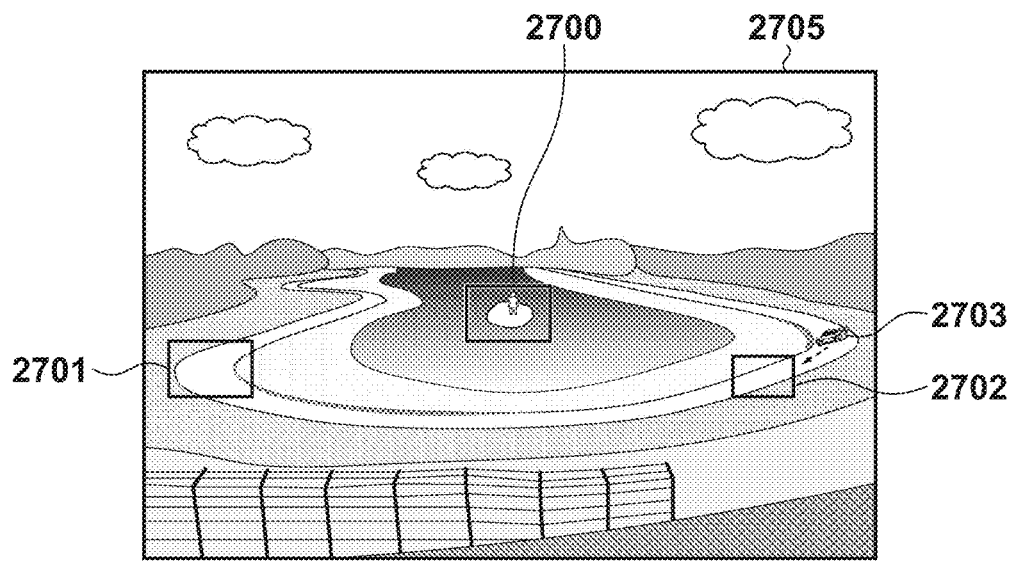
FIGS. 27A and 27B are schematic diagrams showing an example of displayed images according to the twelfth embodiment.

In the twelfth embodiment, it is assumed that the display processing of the zooming target frame and the main shooting frame described with reference to FIGS. 18A and 18B in the eighth embodiment is repeatedly performed in a predetermined cycle, for example, every time a live view image is acquired. FIG. 27A shows a live view image 2705 that is basically displayed on the display unit 113 as a result of the display processing of FIGS. 18A and 18B, and a main shooting frame 2701, zooming target frames 2701 and 2702 are superimposed on the live view image 2705.

Figure 26:
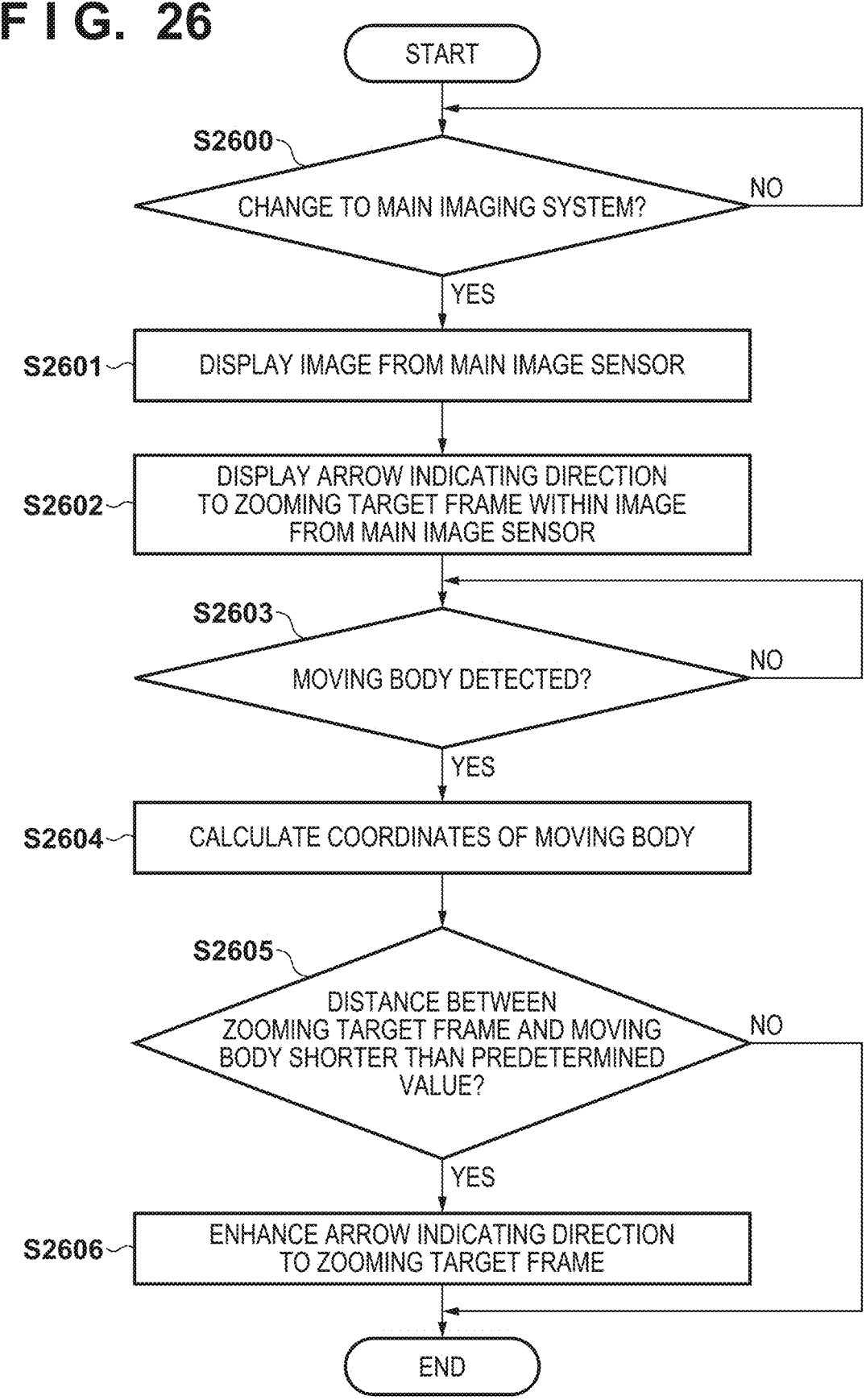
FIG. 26 is a flowchart showing display processing using a zooming target frame according to the twelfth embodiment.

In this state, in step S2600 of FIG. 26, it is determined whether the image to be displayed on the display unit 113 has been switched to the image from the main image sensor 1702 by the user operating the operation unit 115. If it is not determined that the switching has been performed, the process of step S2600 is repeated, and if it is determined that the switching has been performed, the process proceeds to step S2601.

Figure 27B:
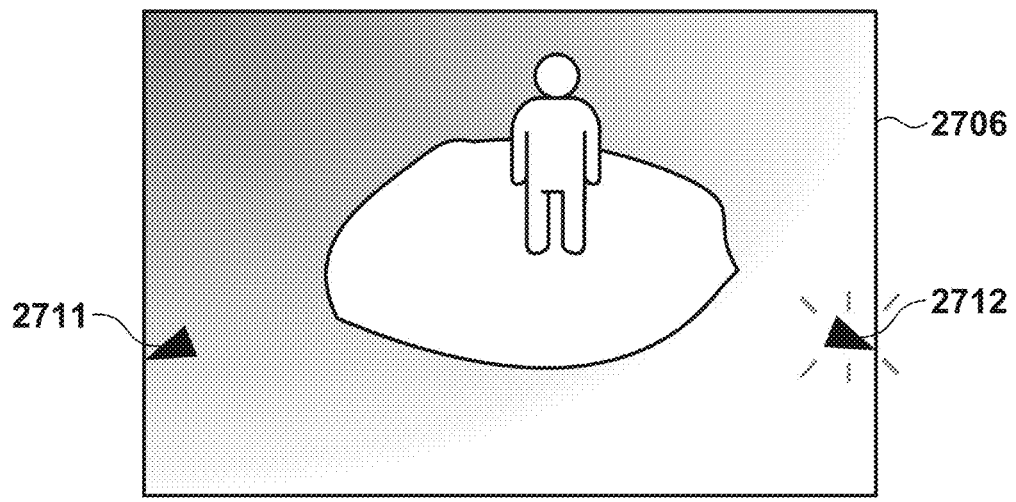

In step S2601, as shown in FIG. 27B, the image displayed on the display unit 113 is switched from the live view image 2705 captured by the sub-image sensor 1705 to an image 2706 captured by the main image sensor 1702. Note that the display processing described with reference to FIGS. 18A and 18B is stopped in response to this switching.

In the next step S2602, the directions to the zooming target frames 2701 and 2702 from the main shooting frame 2700 are displayed on the screen showing the live view image from the main image sensor 1702 as arrows 2711 and 2712 indicating the directions to the zooming target frame positions, respectively.

In the next step S2603, detection of a moving object in an image shot by the sub-image sensor 1705 is performed. Specifically, an area of the moving object is detected by calculating the difference between pixel values of each pixel in different frames of the images obtained by the sub-image sensor 1705 at regular intervals and detecting an area, other than the background area, where an amount of change of the differences is large. Before calculating the difference between pixel values of each pixel in different frames, the alignment process between frames may be performed to correct the amount of camera shake based on camera shake information from a gyro sensor (not shown) included in the digital camera 1700. In the example shown in FIG. 27A, a moving body 2703 is detected. If no moving body is detected, step S2603 is repeated, and if detected, the process proceeds to step S2604.

In step S2604, the coordinate position of the area of the moving body 2703 is calculated, and in the next step S2605, the distances between the calculated area of the moving body 2703, and the zooming target frames 2701 and 2702 are calculated. Then, it is determined whether or not each of the calculated distances is shorter than a predetermined value (that is, whether or not the moving body 2703 is close), and if it is shorter (close), the process proceeds to step S2606, and if not shorter (not close), the processing ends.

In step S2506, the arrow 2712 indicating the direction to the position of the zooming target frame 2602 which is determined to be close to the moving body 2603 is highlighted. As an example of the highlighted display, there is a method of blinking the arrow 2712 as shown in FIG. 27B.

The highlighting of the zooming target frame is not limited to the above method, and as a method of notifying the user of the moving body being close to the zooming target frame, there are a method of displaying an icon on the display unit 113 and a method of making a sound notification from a speaker included in a digital camera 1700.

When the highlighting ends, the process ends.

According to the twelfth embodiment as described above, in addition to the same effects as in the eighth embodiment, it is possible to reduce the loss of the shooting opportunity of the moving body.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-145659, filed on Aug. 7, 2019 which is hereby incorporated by reference herein in its entirety.

What is claimed is:

1. An apparatus comprising:
    a sensor that performs photoelectric conversion on light formed by an optical system and outputs a resultant image;
    a control unit that controls the optical system and the sensor;
    a display control unit that performs control for displaying the image output from the sensor on a display unit; and
    memory that stores a first image output from the sensor in a state that the optical system is controlled to a first focal length,
    wherein the display control unit controls to display, on a second image, which is a live view image, output from the sensor in a state that the optical system is controlled to a second focal length which is shorter than the first focal length, a shooting frame indicating an area in which the second image and the first image coincide, and
    wherein each unit is implemented by one or more processors, circuitry or a combination thereof.

2. The apparatus according to claim 1, further comprising:
    a size determination unit that determines a display size of the shooing frame with respect to the second image based on relationship between the first focal length and the second focal length; and
    a position determination unit that determines a position of the first image with respect to the second image based on the second image, wherein the display control unit controls to superimpose the shooting frame on the second image based on the determined display size and the determined position, and wherein each unit is implemented by one or more processors, circuitry or a combination thereof.

3. The apparatus according to claim 1, wherein the first image is an image in a mode for registering the shooting frame.

4. The apparatus according to claim 1, wherein the memory further stores the first focal length and shooting information of the first image, and the shooting information includes shooting conditions, and the shooting conditions include at least one of shooting mode, aperture value, exposure period, ISO sensitivity, exposure correction, use of flash, use of special effect filter.

5. The apparatus according to claim 4, wherein the display control unit sets a reference position on a display screen of the display unit, and the control unit controls to perform shooting using the shooting conditions in a case where a distance between the reference position and the shooting frame becomes shorter than a predetermined threshold on the display screen.

6. The apparatus according to claim 1, wherein the display control unit sets a reference position on a display screen of the display unit, and enlarges and displays an image in the shooting frame in the second image in a case where a distance between the reference position and the shooting frame becomes shorter than a predetermined threshold on the display screen.

7. The apparatus according to claim 1, wherein the display control unit sets a reference position on a display screen of the display unit, and the control unit controls the optical system to the first focal length in a case where a distance between the reference position and the shooting frame becomes shorter than a predetermined threshold on the display screen.

8. The apparatus according to claim 1, wherein the control unit controls the optical system to the second focal length which is in range in which the shooting frame is displayed in a display screen of the display unit.

9. The apparatus according to claim 1, wherein the display control unit enlarges and displays the second image in range in which the shooting frame is displayed in a display screen of the display unit.

10. The apparatus according to claim 1, further comprising an operation unit that receives an operation by a user, wherein the control unit controls the optical system to shorten the second focal length in a case where a predetermined operation to the operation unit is detected, and wherein the operation unit is implemented by one or more processors, circuitry or a combination thereof.

11. The apparatus according to claim 1, further comprising:

a detection unit that detects a moving body from the second image; and a notification unit that, in a case where a distance between the detected moving body and the shooting frame becomes shorter than a predetermined threshold, notifies that the moving body approaches the shooting frame, wherein the each unit is implemented by one or more processors, circuitry or a combination thereof.

12. The apparatus according to claim 1, wherein the display control unit displays an arrow showing a direction to a position of the first image in a case where the position of the first image with respect to the second image is outside of the second image which is displayed on the display unit.

13. The apparatus according to claim 1, wherein the display control unit sets a reference position on a display screen of the display unit, and the control unit determines whether or not a distance between the reference position and the shooting frame on the display screen is shorter than a threshold.

14. An apparatus comprising:

a first sensor that performs photoelectric conversion on light formed by a first optical system and outputs a resultant first image;

a second sensor that performs photoelectric conversion on light formed by a second optical system whose focal length is shorter than that of the first optical system and outputs a resultant second image;

a control unit that controls the first and second optical systems;

a display control unit that performs control for displaying the first image and the second image on a display unit;

memory that stores a first shot under predetermined conditions and shooting information of the first image; and a selection unit that selects either of the first image or the second image to be displayed on the display unit, wherein the display control unit controls to display a live view image using the second image and display, on the second image a first shooting frame indicating an area of the first image stored in the memory and a second shooting frame indicating an area of the first image currently being output from the first sensor in a case where the second image is selected by the selection unit, and wherein each unit is implemented by one or more processors, circuitry or a combination thereof.

15. The apparatus according to claim 14, wherein the display control unit enlarges and displays an image within the second shooting frame in a case where a distance between the first shooting frame and the second shooting frame becomes shorter than a predetermined threshold on a display screen of the display unit.

16. The apparatus according to claim 14, wherein the selection unit selects the first image output from the first sensor in a case where the second image is selected and a distance between the first shooting frame and the second shooting frame becomes shorter than a predetermined threshold on a display screen of the display unit.

17. The apparatus according to claim 14, wherein, in a case where the second image is selected, the display control unit enlarges and displays the second image in a range in which the first shooting frame is displayed in a display screen of the display unit.

18. The apparatus according to claim 14, further comprising a detection unit that detects a moving body from the second image, wherein the display control unit highlights the second shooting frame in a case where a distance between the detected moving body and the first shooting frame becomes shorter than a predetermined threshold, and wherein the detection unit is implemented by one or more processors, circuitry or a combination thereof.

19. The apparatus according to claim 14, wherein the display control unit displays an arrow showing a direction to a position of the first image in a case where the position of the first image with respect to the second image is outside of the second image which is displayed on the display unit.

20. A method of controlling an apparatus having a sensor that performs photoelectric conversion on light formed by an optical system and outputs a resultant image, comprising:
- storing in memory a first image output from the sensor in a state that the optical system is controlled to a first focal length; and
- displaying, on a second image, which is a live view image, output from the sensor in a state that the optical system is controlled to a second focal length which is shorter than the first focal length, a shooting frame indicating an area in which the second image and the first image coincide.

* * * * *